(12) United States Patent
Wright et al.

(10) Patent No.: US 12,511,644 B2
(45) Date of Patent: Dec. 30, 2025

(54) COMPUTER-IMPLEMENTED METHODS AND SYSTEMS FOR VALIDATING TOKENS FOR BLOCKCHAIN-BASED CRYPTOCURRENCIES

(71) Applicant: nChain Licensing AG, Zug (CH)

(72) Inventors: Craig Steven Wright, London (GB); Stephane Savanah, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/213,245

(22) Filed: Jun. 22, 2023

(65) Prior Publication Data

US 2024/0005304 A1 Jan. 4, 2024

Related U.S. Application Data

(63) Continuation of application No. 16/092,744, filed as application No. PCT/IB2017/052061 on Apr. 10, 2017, now Pat. No. 11,727,391.

(30) Foreign Application Priority Data

Apr. 11, 2016 (GB) ..................... 1606065

(51) Int. Cl.
*G06Q 20/36* (2012.01)
*G06F 21/30* (2013.01)
(Continued)

(52) U.S. Cl.
CPC ......... *G06Q 20/3672* (2013.01); *G06F 21/30* (2013.01); *G06F 21/645* (2013.01);
(Continued)

(58) Field of Classification Search
CPC ............. G06Q 20/3672; G06Q 20/065; G06Q 20/0658; G06Q 20/3678; G06Q 20/3829;
(Continued)

(56) References Cited

U.S. PATENT DOCUMENTS 9,892,460 B1 2/2018 Winklevoss et al.
10,164,779 B2 * 12/2018 Uhr ..................... G06F 16/2246
(Continued)

FOREIGN PATENT DOCUMENTS

AU 2015389877 A1 * 10/2017 ........... H04L 9/3247
CN 102982441 A 3/2013
(Continued)

OTHER PUBLICATIONS

Andreas Antonopoulos, Mastering Bitcoin, Dec. 2014, O'Reilly Media, Inc. (Year: 2014).*

(Continued)

*Primary Examiner* — Chunling Ding
(74) *Attorney, Agent, or Firm* — Tarolli, Sundheim, Covell & Tummino LLP

(57) ABSTRACT

A first token associated with a first set of metadata and a first quantity of an asset is minted. A condition for triggering a process to duplicate the first token is determined to have been fulfilled. A second token that duplicates the first token is minted by at least causing a token minting transaction to be recorded to a peer-to-peer distributed ledger, wherein the token minting transaction associates a second set of metadata with the second token with the second set of metadata matching the first set of metadata, allocates the first quantity of the asset to the second token, and indicates that the first quantity of the asset has been transferred to the second token and that the first token is no longer valid. Aa identifier for the second token is provided, where the identifier is usable to determine that the second token is valid.

8 Claims, 7 Drawing Sheets

(51) Int. Cl.
  *G06F 21/64* (2013.01)
  *G06Q 20/06* (2012.01)
  *G06Q 20/38* (2012.01)
  *G06Q 40/00* (2023.01)

(52) U.S. Cl.
  CPC ....... *G06Q 20/065* (2013.01); *G06Q 20/0658* (2013.01); *G06Q 20/3678* (2013.01); *G06Q 20/3829* (2013.01); *G06Q 20/389* (2013.01); *G06Q 40/00* (2013.01); *G06Q 2220/00* (2013.01)

(58) Field of Classification Search
  CPC .. G06Q 20/389; G06Q 40/00; G06Q 2220/00; G06Q 20/3823; G06Q 20/401; G06Q 10/10; G06Q 20/40; G06Q 20/3825; G06Q 20/405; G06Q 20/326; G06Q 20/3827; G06F 21/30; G06F 21/645; H04L 9/3247; H04L 9/50; H04L 2209/56
  See application file for complete search history.

(56) References Cited

U.S. PATENT DOCUMENTS

| | | | |
|---|---|---|---|
| 10,262,321 | B1 | 4/2019 | Ramanathan et al. |
| 10,719,816 | B1* | 7/2020 | Kurani .................. H04W 48/12 |
| 2004/0172237 | A1 | 9/2004 | Saldanha et al. |
| 2015/0081567 | A1 | 3/2015 | Boyle et al. |
| 2015/0269539 | A1 | 9/2015 | MacGregor et al. |
| 2015/0269570 | A1 | 9/2015 | Phan et al. |
| 2015/0294308 | A1 | 10/2015 | Pauker et al. |
| 2015/0310466 | A1 | 10/2015 | LaCivita et al. |
| 2015/0332395 | A1 | 11/2015 | Walker et al. |
| 2015/0371224 | A1* | 12/2015 | Lingappa ........... G06Q 20/3829 705/71 |
| 2016/0092988 | A1 | 3/2016 | Letourneau |
| 2016/0098723 | A1 | 4/2016 | Feeney |
| 2016/0162897 | A1* | 6/2016 | Feeney ................. H04L 9/3236 705/71 |
| 2016/0224977 | A1* | 8/2016 | Sabba .................. G06Q 20/385 |
| 2016/0260169 | A1 | 9/2016 | Arnold et al. |
| 2016/0267566 | A1 | 9/2016 | Levitt et al. |
| 2016/0292672 | A1 | 10/2016 | Fay et al. |
| 2016/0300234 | A1 | 10/2016 | Moss-Pultz et al. |
| 2016/0342977 | A1 | 11/2016 | Lam |
| 2016/0342989 | A1* | 11/2016 | Davis .................. G06Q 20/065 |
| 2016/0350728 | A1 | 12/2016 | Melika et al. |
| 2017/0005804 | A1* | 1/2017 | Zinder .................. H04L 9/3239 |
| 2017/0046709 | A1* | 2/2017 | Lee .................... G06Q 20/0655 |
| 2017/0161734 | A1* | 6/2017 | Bankston ............. G06Q 20/405 |
| 2017/0286951 | A1* | 10/2017 | Ignatchenko ...... G06Q 20/3823 |
| 2018/0331837 | A1* | 11/2018 | Uhr ........................ H04L 12/08 |
| 2019/0005470 | A1 | 1/2019 | Uhr et al. |
| 2019/0058590 | A1 | 2/2019 | Watanabe et al. |

FOREIGN PATENT DOCUMENTS

| | | | |
|---|---|---|---|
| FR | 3018370 | A1 | 9/2015 |
| KR | 20010057169 | A | 7/2001 |
| KR | 20140038473 | A | 3/2014 |
| KR | 20160009301 | A | 1/2016 |
| WO | 2014201059 | A1 | 12/2014 |
| WO | 2016170538 | A1 | 10/2016 |

OTHER PUBLICATIONS

Antonopoulos, "A P2SH Transactions Locks the Output to this Hash Instead of the Longer Script, Using the Locking Script," 2012, 1 page.

Antonopoulos, "Mastering Bitcoin—Unlocking Digital Cryptocurrencies," O'Reilly Media, Inc., Dec. 20, 2014, 282 pages.

Bitcoin Wiki, "Colored Coins," retrieved from https://en.bitcoin.it/wiki/Colored_Coins, Feb. 3, 2017, 7 pages.

Bitfury Group, "Digital Assets on Public Blockchains," retrieved from http://bitfury.com/content/5-white-papers-research/bitfury-digital_assets_on_public_blockchains-1.pdf, Mar. 15, 2016, 37 pages.

Chromaway, "Blockchain and Future House Purchases," retrieved from http://chromaway.com/landregistry/, Dec. 29, 2016, 10 pages.

Coinprism, "Proof of Authenticity of Cryto-Assets with Coinprism," retrieved from http://blog.coinprism.com/2014/09/10/proof-of-authenticity-of-cryptoassets/, Sep. 10, 2014, 15 pages.

Daniel, "Overstock Files to Offer Stock that Works Like Bitcoin," retrieved from https://www.reddit.com/r/Bitcoin/comments/25joig/when_will_contracts_on_the_blockchain_be_enforced/, Apr. 27, 2015, 18 pages.

Deloitte, "Blockchain Enigma Paradox Opportunity," retrieved from http://bravenewcoin.com/assets/Industry-Reports-2016/Deloitte-Blockchain-EnigmaParadox-Opportunity.pdf, 2016, 25 pages.

Goth_Toon et al., "When Will Contracts on the Blockchain be Enforced in the Real World?" retrieved from https://www.reddit.com/r/Bitcoin/comments/25joig/when_will_contracts_on_the_blockchain_be_enforced/, May 14, 2014, 13 pages.

Hancock et al., "Distributed Ledger Technology: Beyond Block Chain," retrieved from https://www.gov.uk/government/uploads/system/uploads/attachment_data/file/492972/gs-16-1-distributed-ledger-technology.pdf, 2016, 88 pages.

International Search Report and Written Opinion for Application No. PCT/IB2017/052061, mailed Jun. 6, 2017, filed Apr. 10, 2017, 11 pages.

Japanese Office Action mailed Apr. 13, 2021, Patent Application No. 2018-549926, 10 pages.

Mizrahi, "A Blockchain-Based Property Ownership Recording System," retrieved from http://chromaway.com/papers/A-blockchain-based-property-registry.pdf, 9 pages.

Nakamoto, "Bitcoin: A Peer-to-Peer Electronic Cash System," Bitcoin, Oct. 31, 2008, https://bitcoin.org/bitcoin.pdf, 9 pages.

Nguyen et al., "Open Blockchain Protocol Specification," retrieved from https://github.com/rameshthoomu/obc-docs-1/blob/master/protocol-spec.md, Dec. 29, 2016, 59 pages.

Nguyen, "OBC Identity Management," retrieved from https://github.com/rameshthoomu/obc-docs-1/blob/master/FAQ/identity_management_FAQ.md, 2016, 1 page.

Provenance, "Blockchain: The Solution for Transparency in Product," retrieved from https://www.provenance.org/whitepaper, 2015, 24 pages.

Satoshi et al., "Connection Limits," Bitcoin Forum, Aug. 9, 2010, https:/bitcointalk.org/index.php?topic=741.0;prev_next=prev, 2 pages.

Snow et al., "Business Processes Secured by Immutable Audit Trails on the Blockchain," retrieved from https://www.factom.com/assets/docs/FactomWhitePaper1.0.pdf, Nov. 17, 2014, 38 pages.

UK Commercial Search Report mailed Dec. 8, 2016, Patent Application No. 1606065.9, 10 pages.

UK IPO Search Report mailed Dec. 21, 2016, Patent Application No. GB1606065.9, 7 pages.

* cited by examiner

Issuer (I) creates a first token (T1) for first user (A)

First user (A) transfers first token (T1) to second user (B)

COMPUTER-IMPLEMENTED METHODS AND SYSTEMS FOR VALIDATING TOKENS FOR BLOCKCHAIN-BASED CRYPTOCURRENCIES

CROSS REFERENCE TO RELATED APPLICATIONS

This application is a continuation of U.S. patent application Ser. No. 16/092,744, filed Oct. 10, 2018, entitled "COMPUTER-IMPLEMENTED METHODS AND SYSTEMS FOR VALIDATING TOKENS FOR BLOCKCHAIN-BASED CRYPTOCURRENCIES," which is a 371 National Stage of International Patent Application No. PCT/IB2017/052061, filed Apr. 10, 2017, which claims priority to United Kingdom Patent Application No. 1606065.9, filed Apr. 11, 2016, the disclosures of which are incorporated herein by reference in their entirety.

TECHNICAL FIELD

The present invention relates generally to distributed ledger technologies such as, but not limited to, the Bitcoin blockchain. Described embodiments relate to security-enhanced systems and methods for validating tokens for blockchain based cryptocurrencies. Some embodiments relate to validating tokens associated with blockchain transactions (TXs) that have not been electronically countersigned by an authorised signatory. Other embodiments relate to systems and computer-implemented control method arranged to enable and improve the transfer and communication of blockchain-implemented tokens between computing nodes.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger that is implemented as a computer-based decentralised, distributed system made up of blocks, which in turn are made up of transactions. Each transaction (TX) is a data structure that encodes the transfer of control of a digital asset between participants in the blockchain system and includes at least one input and at least one output. Each block contains a hash of the previous block to that blocks become chained together to create a permanent, unalterable record of all transactions that have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes that are not limited to the realm of cryptocurrency. Such solutions would be able to harness the benefits of the blockchain (e.g., a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract, which would be written in natural language, a smart contract is a machine executable program that comprises rules that can process inputs in order to produce results, which can then cause actions to be performed dependent upon those results. In respect of commercial transactions, for example, these may involve the transfer of property rights and/or assets. Such assets may include real property, personal property (including both tangible and intangible property), digital assets such as software, for example, or any other type of asset. In the digital economy, there is often an expectation that exchanges and transfers will be performed in a timely manner and across vast distances. This expectation, along with practical, technical limitations, mean that traditional forms of asset transfer, such as physical delivery of hardcopy of documents representing a contract, negotiable instrument, etc. or the tangible asset itself is not desirable. Thus, smart contracts can provide enhanced control, efficiency and speed of transfer.

Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced from the blockchain. The use of tokenisation provides enhanced security and control in respect of the communication, transfer and verification of digital entities on the blockchain.

Any discussion of documents, acts, materials, devices, articles or the like that have been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Embodiments of the invention are provided as defined in the appended claims.

The invention may be described as a verification or authentication method and corresponding system, as it may enable the determination and/or identification of blockchain transactions that comprise or relate to token(s) and that have been digitally signed by an authorised signatory. This may be the token issuer or another party. Security is enhanced as a result of the verification technique.

Some embodiments relate to a computer-implemented method of determining the validity of a token associated with a quantity of cryptocurrency. The method may comprise: a second user: receiving, over a communications network, a first transaction comprising a transfer of the token from a first user to the second user; querying a peer-to-peer distributed ledger (blockchain) to determine whether an authenticated transaction associated with the token can be identified, wherein the authenticated transaction comprises a previous transaction associated with the token and wherein the token has been authorised; and responsive to identifying an authenticated transaction, determining that the token is valid.

In some embodiments, querying the peer-to-peer distributed ledger comprises querying the peer-to-peer distributed ledger in response to determining that the token of the first transaction has not been authenticated.

In some embodiments, determining that the token has not been authenticated comprises determining that a redeem script associated with the token and referenced as an input to the first transaction has not been (cryptographically) signed by an authorised signatory. The token of the authorised transaction may be signed by an authorised signatory. For example, the authorised signatory may comprise at least one of an issuer of the token and a trusted service provider.

In some embodiments, querying a peer-to-peer distributed ledger comprises: a) determining a previous transaction ID indicated in the first transaction; b) identifying a prior transaction recorded in the peer-to-peer distributed ledger, wherein the transaction ID of the prior transaction corresponds with the determined previous transaction ID; c) determining whether a redeem script of the prior transaction has been signed by an authorised signatory; d) responsive to determining that the redeem script of the prior transaction has been signed by an authorised signatory, identifying the prior transaction as the authorised transaction; e) responsive to determining that the redeem script of the prior transaction has not been signed by an authorised signatory, determining a previous transaction ID indicated in the prior transaction as the previous transaction ID; and identifying a further prior transaction recorded in the peer-to-peer distributed ledger as the prior transaction, wherein a transaction ID of the further prior transaction corresponds with the previous transaction ID; and f) iteratively performing steps c) to e) until no further prior transactions are identified.

Thus, the invention may comprise performance of one or more of the above steps to: inspect different transactions within respective blocks on the blockchain, starting from an initial or "trigger" transaction, to follow a logical path or hierarchy of transactions until the token's validity is established or at least sufficiently evidenced, or validation fails.

In some embodiments, the method further comprises responsive to failing to identify an authenticated transaction in the peer-to-peer distributed ledger, determining that the token is invalid.

Some embodiments relate to computer-implemented method of determining the validity of a token associated with a quantity of cryptocurrency, the method comprising: a second user: receiving, over a communications network, a first transaction comprising a transfer of the token from a first user to the second user; querying a title registry database to determine if a second transaction comprising a transfer of the token is recorded in the title registry database; and responsive to determining that the second transaction is recorded in the title registry database, determining that the token is valid. For example, the second transaction may predate the first transaction.

In some embodiments, querying the title registry database comprises querying the title registry database in response to determining that the token has not been authenticated.

In some embodiments, the title registry database comprises one or more entries relating to transactions comprising a transfer of a token, each entry being associated with a transaction indicator and wherein querying the title registry database comprises determining a transaction indicator associated with the token from the first transaction; and comparing the transaction indicator with the one or more transaction indicators of the title registry database to identify the second transaction. For example, the transaction indicator may comprise a transaction ID.

In some embodiments, determining that the token has not been authenticated comprises determining that a first redeem script associated with the token and referenced as an input to the transaction has not been signed by an authorised signatory. The authorised signatory may comprise at least one of an issuer of the token and a trusted service provider.

In some embodiments, the method further comprises responsive to determining that the second transaction is not recorded in the title registry database, determining that the token is invalid.

In some embodiments, the method further comprises responsive to determining that the second transaction is not recorded in the title registry database, querying a peer-to-peer distributed ledger to determine whether an authenticated transaction associated with the token can be identified, wherein the authenticated transaction comprises a previous transaction associated with the token, wherein the token has been authorised and responsive to identifying an authenticated transaction, determining that the token is valid.

Some embodiments relate to a computer-implemented method of maintaining, by a first party, a title registry database for recording transfers of tokens issued by an issuer, wherein each token is associated with a quantity of cryptocurrency, the method comprising: monitoring a peer-to-peer distributed ledger for transactions comprising transfers of tokens issued by the issuer; and responsive to determining a first transaction comprising a transfer of a token issued by the issuer recorded in the peer-to-peer distributed ledger, recording the transfer of the token in the title registry database.

In some embodiments, monitoring the peer-to-peer distributed ledger further comprises: determining a previous transaction ID of a transaction recorded in the peer-to-peer distributed ledger; comparing the determined previous transaction ID with a set of transaction IDs, each transaction ID of the set identifying a transaction associated with a token issued by the issuer; and responsive to the determined previous transaction ID matching one of the set of transaction IDs, determining the transaction associated with the previous transaction ID as the record of the first transaction comprising a transfer of tokens issued by the issuer.

In some embodiments, monitoring the peer-to-peer distributed ledger further comprises: determining a target transaction ID of a transaction associated with a token issued by the issuer; comparing the target transaction ID with previous transaction IDs of transactions recorded in the peer-to-peer distributed ledger; and responsive to the target transaction ID matching a previous transaction ID of one of the transactions recorded in the peer-to-peer distributed ledger, determining the transaction recorded in the peer-to-peer distributed ledger as the record of the first transaction.

In some embodiments, the method further comprises authenticating an entry associated with the recording of the transfer of the token in the title registry database by adding the issuer's signature to the entry.

In some embodiments, maintaining the title registry database is performed by at least one of the issuer and an approved service provider.

In some embodiments, the title registry database comprises a distributed hash table. For example, the distributed hash table may comprise contracts associated with the tokens issued by the issuer.

Some embodiments relate to a token validation system for determining the validity of a token associated with a quantity of cryptocurrency, the system comprising memory for storing a validation application and a processor, wherein the processor is configured to execute the validation application to perform any of the described methods.

Some embodiments relate to title registry maintenance system for maintaining a title registry database for recording transfers of tokens, each associated with a quantity of cryptocurrency, the system comprising memory for storing a maintenance application and a processor, wherein the processor is configured to execute the maintenance application to perform any of the described methods.

Some embodiments relate to a computer software program, including machine-readable instructions, when executed by a processor, causes the processor to perform any of the described methods.

BRIEF DESCRIPTION OF DRAWINGS

Examples of the present disclosure will be described with reference to.

DESCRIPTION OF EMBODIMENTS

Described embodiments relate to systems and computer-implemented methods for validating tokens for implementation in conjunction with blockchain based cryptocurrencies such as, for example, Bitcoin. Some embodiments relate to validating tokens associated with transactions that have not been countersigned by an authorised signatory. Other embodiments relate to systems and computer-implemented method for maintaining a title registry database for recording transfers of tokens. The token may be a representation or identifier that is associated with some type or physical, electronic, digital or abstract entity or asset.

Some embodiments relate to systems and computer-implemented methods for determining the validity of a token (T) associated with a quantity of cryptocurrency (B1), wherein the token (T) is transferred from a first user (A) to a second user (B), for example, by means of a blockchain transaction Tx comprising (effecting) a transfer of the token (T). In some embodiments, the token (T) has not been authenticated, for example, by an authorised signatory, such as an issuer of the token (T) or a trusted service provider.

In some embodiments, a peer-to-peer distributed ledger (blockchain) may be queried to determine whether an authenticated transaction associated with the token (T) can be identified. This may or may not be the Bitcoin blockchain. For example, such an authenticated transaction may comprise a prior transaction associated with the token (T) where the token (T) has been authorised. In response to an authenticated transaction being identified, the token (T) may be determined to be valid. A "prior" transaction refers to a transaction that has been previously written to the blockchain i.e., at an earlier date. It should be recalled that blocks (and thus transactions) are written to the blockchain in a chronological sequence. The previous transaction may be described as a transaction that is further back in the chain of blocks, i.e., closer to the originating genesis block.

In some embodiments, a title registry storage resource e.g., database may be queried to determine if a second transaction comprising a transfer of the token (T) is registered or recorded in the title registry storage, where the second transaction predates the first transaction. In response to the second transaction (T2) being determined as having been recorded in the title registry store, the token (T) may be determined to be valid.

In some embodiments, a party (P), such as an issuer (I) of the token (T), may be responsible for maintaining the title registry storage by recording any transaction comprising a transfer of the token in the title registry storage.

Figure 1:
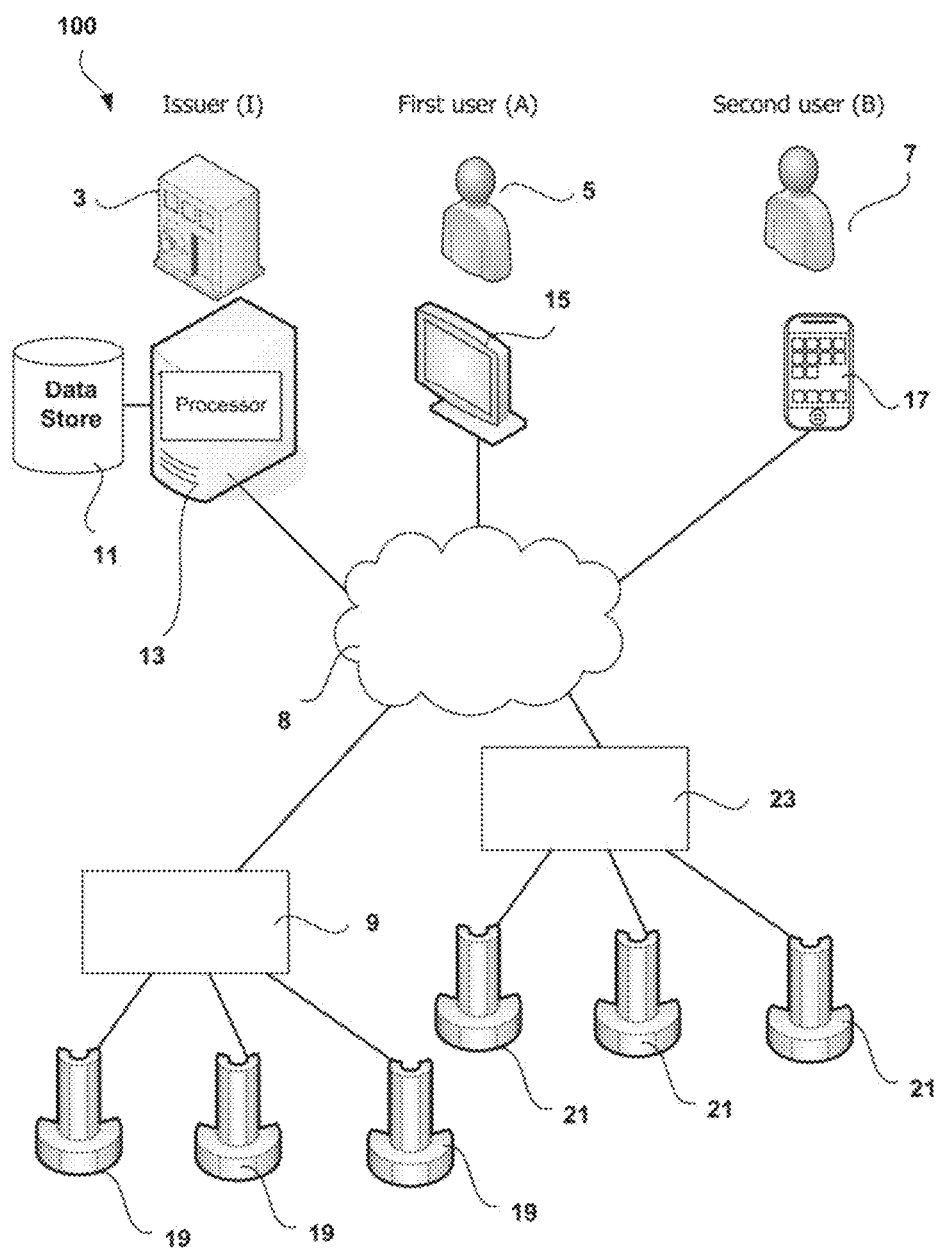
FIG. 1 is a schematic of an example system for creating and/or transferring tokens, according to some embodiments.

Referring now to FIG. 1, there is illustrated a system 1 comprising a first processing device 13 associated with an issuer (I) 3, a second processing device 15 associated with a first user (A) 5, and a third processing device 17 associated with a second user (B) 7. The first processing device 13, second processing device 15, and the third processing device 17 may be in communication with one another across a communications network 8. The first processing device 13 may also comprise or be in communication with, for example, directly or over the communications network 8, an associated data store 11.

Although the first processing device 13 is illustrated as a single node, it will be appreciated that the first processing device 13 may comprise one or more nodes associated with the issuer (I) 3 and one or more steps of any method described as being performed by first processing device 13 may be distributed and performed at different and/or multiples of the nodes of the first processing device 13.

In some embodiments, the second processing device 15 and the third processing device 17 may be a computer, a mobile communication device, or other electronic device used by the respective first and second user 5, 7. In other examples, the second processing device 15 and the third processing device 17 may be virtual machines accessible by the first and second users, respectively, via a terminal or other interface.

The issuer (I) 3 creates tokens and may be, for example, a bank, another financial institution, mint, company, etc. However, in other examples, the issuer may not be a financial institution and the invention is not limited to financially oriented applications. The first user (A) 5 may request the creation of a token from the issuer (I) 3, may request to redeem part of or all of the value of a token with the issuer (I) 3, and/or request to transfer part of or all of the value of a token to the second user (B) 7. Similarly, the second user (B) 7 may request the creation of a token from the issuer (I) 3, may request to redeem part of or all of the value of a token with the issuer (I) 3, or request to transfer part of or all of the value of a token to the first user (A) 5.

The system 1 also comprises one or more processing devices 19 for managing a peer-to peer distributed ledger (blockchain) 9 for recording transactions. In particular, the one or more processing devices 19 may be configured to receive transactions, for example, from the first, second, and/or third processing devices 13, 15, and 17, respectively, across the communications network 8, and to record the transactions. An example of a peer-to-peer distributed ledger 9 includes the block chain, which is a distributed network of transactions (TXs) based on the bitcoin protocol. Thus, in some embodiments, the one or more processing devices 19 may be associated with "miners". Therefore, the invention comprises one or more processing devices 19 that are in communication with a blockchain-implemented distributed network. The network and various devices intercommunicate to put the invention into effect.

In some embodiments, the system 1 also comprises one or more processing devices 21 for managing a title registry database 23 for recording transactions associated with transfers of tokens. The one or more processing devices 21 may be in communication with the first, second, and/or third processing devices 13, 15, and 17, and/or the one or more processing devices 19 across the communications network 8. In particular, the one or more processing devices 19 may be configured to receive and record data pertaining to transactions comprising transfers of tokens (T).

Overview of Transactions Involving Tokens

There are three general types of transactions that involve tokens, namely, the creation of tokens by the issuer (I) 3, the redeeming of part of or all of the value of a token by the first user (A) 5 or the second user (B) 7 with the issuer (I), or the transfer of part of or all the value of a token by the first user (A) 5 or the second user (B) 7 to the second user (B) 7 or the first user (A) 5, respectively.

Figure 2:
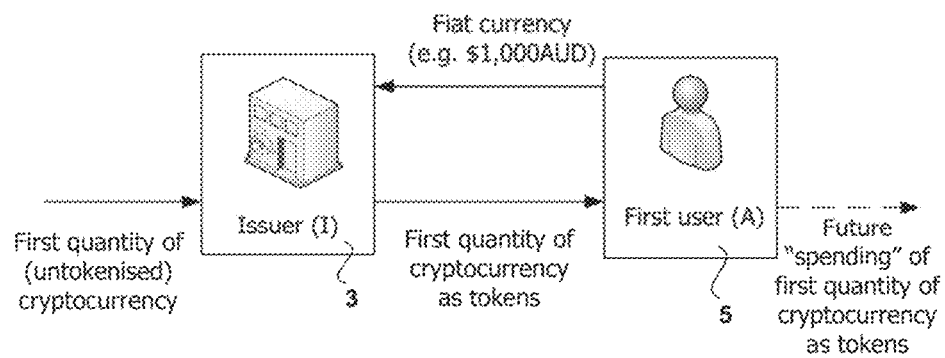
FIG. 2 is a diagram illustrating an example of a first type of transaction between a first user and an issuer that includes creating a token.

Referring to FIG. 2, the creation of a first token (T1) generally involves the first user (A) transferring fiat currency (e.g., $1,000 AUD) to the issuer (I) 3 and in exchange for the fiat currency, the issuer (I) "tokenising" a first quantity of cryptocurrency (B1) such that it has a token value and transferring this first quantity of cryptocurrency (B1) to the first user (A) 5. The first token (T1) may be representative of a contract, such as a contract where the issuer (I) agrees to redeem the bearer of the first token (T1) for a specified fiat currency amount (e.g., $1,000 AUD). Therefore, the first token (T1) may be similar to a negotiable instrument. Depending on the particular terms and conditions, the first user (A) 5 may redeem the first token (T1) at a future date for a value associated with the deposited fiat currency. The terms and conditions may also allow the first user (A) 5 to have at least part of the value of the token transferred to the second user (B). Such terms and conditions may be specific to the token or may be general terms and conditions between the users 5, 7 and the issuer (I) 3.

Overview of Method of Creating a Token

A method 300 of creating a token will be described in detail below with reference to FIGS. 2 and 3. In particular, the method 300 includes allocating a first quantity of cryptocurrency (B1) for association with a first token (T1), at 310. The method further includes determining a first hash (H1) of a first redeem script (RS1), wherein the first redeem script (RS1) is based on: at least a first metadata (MD1) that includes information associated with the first token (T1); the first user public key (P1A); and a first issuer public key (P1I) associated with the issuer (I), wherein the first issuer public key (P1I) forms a cryptographic pair with a first issuer private key (V1I), at 312. The method 300 also includes sending, over the communications network 8, a first data output (O1) to the blockchain 9, at 314. The first data output (O1) includes: an indication of a transaction of the first quantity of cryptocurrency (B1) to the first user (A) 5; and the first hash (H1), wherein the first hash (H1) is associated with the first quantity of cryptocurrency (B1), to provide the first token (T1) that is associated with the first user (A) 5 and issuer (I).

Thus, the method 300 allows for the creation of a token whereby a record of the token is sent to the blockchain 9. An advantage of recording this transaction on the blockchain 9 is that it may allow the recipient, such as the first user (A) 5 to validate the existence of the token (T1). Furthermore, since the at least first metadata (MD1) that includes information associated with the first token (T1) is hashed, this allows the validation of the transaction (which is on the public record) against the information associated with the token. In one example, information associated with the first token (T1) may be terms and conditions of a contract. Thus, including the terms and conditions in the first redeem script to be hashed may advantageously provide comfort to the first user (A) 5 (or any other user) that the terms and conditions cannot be varied as any variation would alter the first hash (H1). Since the first hash (H1) was sent and recorded on the blockchain 9 at the time of creating the first token (T1), it would be impossible (or difficult) to alter the terms and conditions at a later time that would provide an identical first hash (H1).

Detailed Method of Creating a Token

Figure 3:
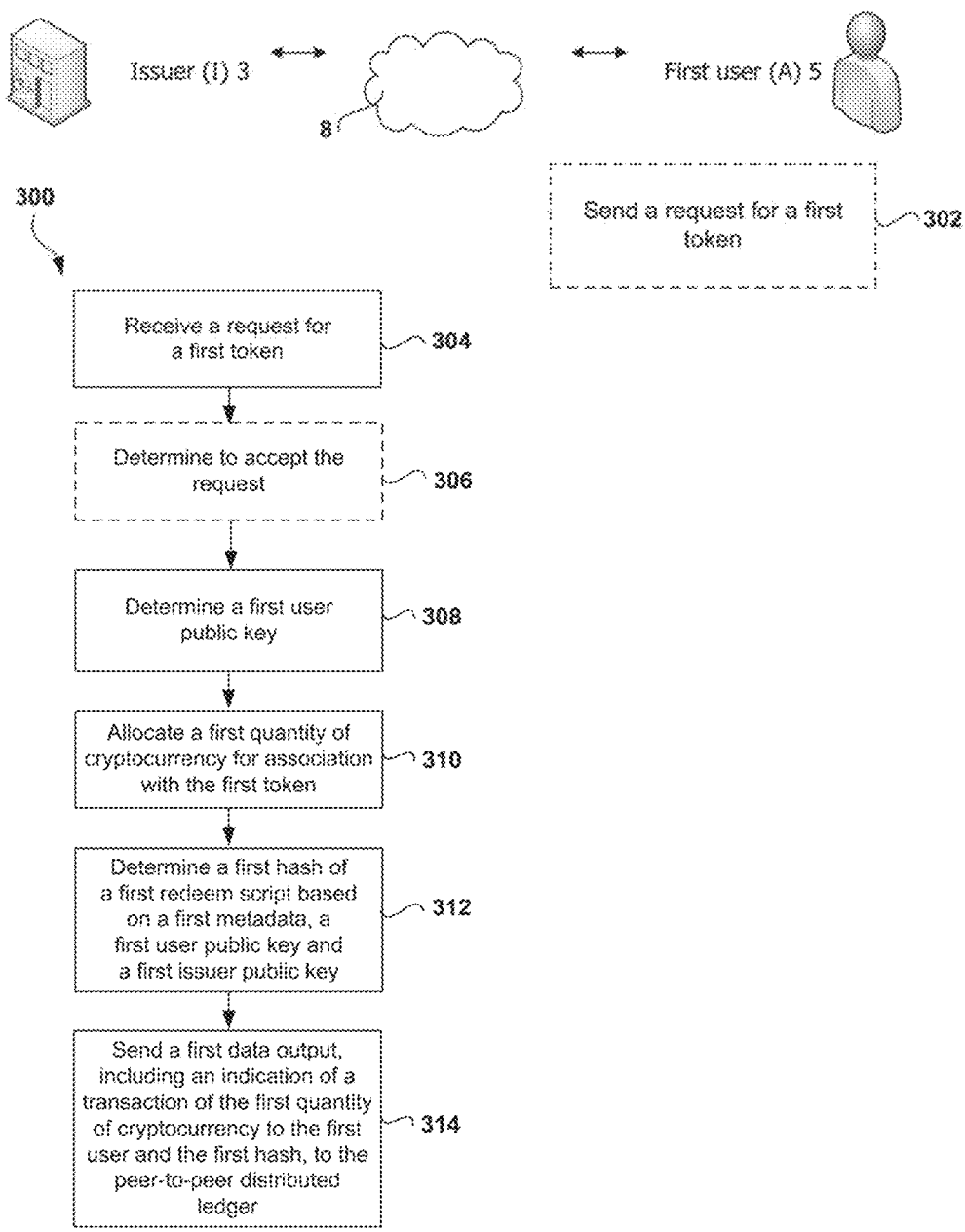
FIG. 3 is a process flow diagram of a computer-implemented method for creating a token, according to some embodiments.

Referring to FIG. 3, there is shown the method 300 of creating a first token (T1), according to some embodiments.

In this example, the creating tokens will be discussed in the context of the first user (A) 5 depositing cash with the issuer (I) 3 in return for tokens representing the deposited cash. However, it is to be appreciated that this is a non-limiting example and that the tokens can be created in the context of other transactions. For example, the token may represent any other contract, negotiable instrument, tangible property, etc.

Agreeing on Terms and Conditions for the Token

The first user (A) 5 instigates the creation of a first token (T1) by transmitting from the second processing device 15 a request for the first token (T1) to the first processing device 13 associated with the issuer (I) 3, at 302. In one example, the first user (A) 5 makes this request by depositing fiat currency, for example $1000 AUD, with a request to have this amount in tokens (T1). The request may include an offer for a contract, which may include one or more terms and conditions of a contract. For example, the first user (A) 5 may include in the request that the tokens associated with the deposit of $1000 AUD should have a fixed pegging rate to cryptocurrency. For example, a request that the pegging rate is 1000 satoshi/cent (AUD). It is to be appreciated that other terms and conditions may be included in the offer, such as account keeping fees, transaction fees, how the tokens can be redeemed, etc.

The first processing device 13 of the issuer (I) receives, over the communications network 8, the request from the first user (A) 5 for the first token (T1) and, in some cases, at least some of the terms and conditions, at 304. In some embodiments, the issuer (I) determines whether to accept the request, propose a counteroffer that includes a modification of the terms and conditions of the request, or reject the request, at 306. In some embodiments, the method 300 may include sending by the issuer (I), over the communications network 8, the result of the determination in step 304, to the first user (A) 5.

In some embodiments, the request sent to the issuer (I) may simply include a request for a first token (T1). In this case, the issuer (I) may send an offer, including terms and conditions, to the first user (A) 5. The first user (A) 5 may, in turn, determine whether to accept the offer, propose a counteroffer, or reject the offer, which is then sent to the issuer (I). It will be appreciated that multiple rounds of offers and counteroffers may be sent and received between the issuer (I) and first user (A) 5 until they are in agreement. In some embodiments, the terms and conditions may be standardised, whereby the user accepts the terms and conditions by performing the steps in the method 300. In one example, the issuer (I) may have standardised offers for tokens for their customers, including the first user (A) 5. Such offers for tokens may be listed publicly, such as on a public exchange or on the issuer's website. Standing offers may also be provided by the issuer (I) to the first user (A) 5 privately, such as by email, through an application, or by logging in a secure website. The contract terms and conditions associated with the token may be stored in the data store 11, sent to a third party for storage, or torrented. In some embodiments, the terms and conditions may be stored on a distributed hast table (DHT).

Determining the First User Public Key

The method 300 includes determining a first user public key (P1A) of a cryptographic pair associated with the first user (A) 5, the cryptographic pair including a first user private key (V1A) and the first user public key (P1A), at 308. In one example, the first user public key (P1A) may be sent from the first user (A) 5, over the communications network 8, to the issuer (I). In another example, the first user public key (P1A) may be associated stored in the data store 11 (which may, for example, be received and stored during registration of the first user (A) 5). Thus, the step of determining 308 the first user public key (P1A) may include retrieving the key from the data store 11. In yet another example, the first user public key (P1A) may be received, over the communications network 8, from a third party. The third party may include, for example, a trusted third party that acts as a public directory, such as a certification authority.

Allocating a First Quantity of Cryptocurrency for Association with the Token

The method 300 includes allocating a first quantity of cryptocurrency (B1) for association with the first token (T1), at 310. In order for a record of a transaction involving the first token (T1) to be recorded on the peer-to-peer distributed ledger (which in this example is the block chain), the token must be associated with a quantity of cryptocurrency. In turn, that quantity of cryptocurrency is recorded on the blockchain as a transaction from the issuer (I) 3 to the first user (A) 5.

The allocation of the first quantity of cryptocurrency (B1) for association with the first token (T1) may be based on a ratio of the token value. For example, a pegging rate (PR1) may be specified for the first token (T1). Thus, allocating a first quantity of cryptocurrency (B1) at 310 may include determining a first quantity of cryptocurrency (B1) based on the pegging rate (PR1) and the first token value (TV1). As an illustrative example, the pegging rate (PR1) may be 1000 satoshis/cent AUD and the first token value (TV1) is $1000 AUD. Thus, the first quantity of cryptocurrency (B1) may be 10,000,000.

The quantity of cryptocurrency to be allocated for a token may be influenced by some of the following considerations. Firstly, the allocated quantity of cryptocurrency ideally has a market value (for this purpose, this means the market value of the cryptocurrency in itself, assuming it has a value, without reference to the token value) that is less than the value of the token ("token value"). This is desirable so that there is no motivation to use the quantity of cryptocurrency for the underlying value rather than as a token. This may be analogous to cash coins where it is desirable to have the face value of the coin to be higher than the metal the coin is minted from, so that there is no desire to melt the coins for the value of the metal. In some examples, the token value is multiples larger than the underlying value of the quantity of cryptocurrency. However, it is to be appreciated that some token may not have a fixed or easily determinable token value. For example, the token may be representative of a contract to perform work, whereby the value may change day to day. In other examples, the contract may only have a value that is determinable on the day it is redeemed.

Another consideration is that the quantity of cryptocurrency allocated should not be too large, relative to the token value or the value of the transaction, since recording a transaction of the quantity of cryptocurrency on the peerto-peer distributed ledger may be at a cost, such as incurring a transaction fee. In some examples, the transaction fee is based on the quantity of cryptocurrency in the transaction and therefore it may be desirable to keep the quantity of cryptocurrency for the token at a minimum level.

On the other hand, the quantity of cryptocurrency allocated for association with the token cannot be infinitely small. Firstly, the cryptocurrency may have a minimum denomination amount, and for example, Bitcoin has a minimum amount of one satoshi (where 1 bitcoin (BTC)=satoshi). Secondly, a transaction of cryptocurrency may be limited to a minimum size or else it will not be recorded (or the cost of the transaction will be close to, or exceed, the cost of performing the transaction). This minimum amount, in some examples, is a "dust" limit. Thus, in some examples, allocating a quantity of cryptocurrency for a token must be above a minimum threshold of cryptocurrency (MT1). Therefore, the method 100 may include determining the minimum threshold of cryptocurrency (MT1) suitable for the first token (T1) and determining a first quantity of cryptocurrency (B1) that is at or above the minimum threshold of cryptocurrency (MT1). In one example, the minimum threshold of cryptocurrency (MT1), in "Bitcoin", is 546 satoshi s.

Another consideration when allocating the quantity of cryptocurrency for a token is divisibility of the quantity of cryptocurrency for subsequent tokens. For example, the first token (T1) may have a token value (TV1) of $1000 AUD and the first user (A) 5 may wish to transfer $800 AUD of the token value to the second user (B) 7 and keep the remaining $200 AUD tokens. Such a transaction would involve a transaction with the first token (T1) that results in a second token (T2) representing $200 AUD that stays with the first user (A) 5 as change and creating a third token (T3) representing $800 AUD to be transferred to the second user (B) 7. Thus, the result of this transfer is two tokens, the second token (T2) and third token (T3), where each of these tokens must also be allocated a quantity of cryptocurrency. If the first quantity of cryptocurrency (B1) was minimal, for example at the "dust" limit, then further amounts of cryptocurrency will need to be sourced so that each of the new tokens created are also associated with sufficient quantities of cryptocurrency to satisfy a minimum threshold. Therefore, there may be advantages to allocating a sufficient quantity of cryptocurrency (B1) for the first token (T1) such that the amount is sufficient to be divided up to be used for an anticipated number of subsequent tokens.

In one example, the terms and conditions may specify the quantity of cryptocurrency or the minimum value or denomination of a token. For example, the term and conditions may set the minimum denomination of token value to $10 AUD. Therefore, allocating a first quantity of cryptocurrency (B1) for a first token (T1) with a token value (TV1) of $1000 AUD may include determining a first quantity that will ensure that there is sufficient cryptocurrency if the entire token value (TV1) is divided up to the smallest denomination. In this example, the token value (TV1) may be divided to 100 subsequent tokens (calculated by $1000/$10). Therefore, a suitable first quantity of cryptocurrency (B1) may be 100 times the "dust" limit.

Determining a First Hash (H1) of a First Redeem Script (RS1)

The method 300 further includes determining a first hash (H1) of a first redeem script (RS1), at 312. In one example, the hash of the redeem script may be used to provide a pay to script hash (P2SH) address for a pay to script hash transaction. An example includes the hash functions used in P2SH script in the Bitcoin protocol. This may include a combination of SHA 256 followed by RIPEMD160.

The first redeem script (RS1) is a script that may be used to unlock the first token (T1), which, as discussed later, includes a transaction of the first quantity of cryptocurrency (B1). When unlocking the first token (T1), certain conditions of the first redeem script (RS1) must be met to unlock the transaction. In particular, the signatures of the first user (A) 5 and issuer (I) are required. An example of the first redeem script (RS1) will now be described.

The First Redeem Script (RS1)

The first redeem script (RS1) is based on: at least a first metadata (MD1) that includes information associated with the first token, the first user public key (PIA) and the first issuer public key (P1I).

(i) Redeem Script in P2SH in General

As background, in a pay to script hash (P2SH) method the redeem script may take the form of:

<NumSigs PubK1 PubK2 . . . PubK15 NumKeys OP_CHECKMULTISIG> where

NumSigs—is the number "m" of valid signatures required to satisfy the redeem script to unlock the transaction PubK1, PubK2 . . . PubK15—are the public keys that correspond to signatures that unlock the transaction (up to a maximum of 15 public keys)

NumKeys—is the number "n" of public keys (which must be 15 or less)

To unlock the above redeem script, at least a number "m" of signatures corresponding to the public keys are required. In some examples, the order of the public keys is important and the number "m" out of "n" signatures for signing must be done in sequence. For example, say that "m" is two and the number of public keys "n" is fifteen. Say that two signatures are available for use, say Sig1 (corresponding to PubK1) and Sig 15 (corresponding to PubK15), the redeem script must be signed by Sig1 first followed by Sig15.

(ii) The First Redeem Script (RS1) Using P2SH

Turning back to the present example, the first redeem script (RS1) that utilises P2SH may include the at least first metadata (MD1) in the redeem script. In particular, the at least first metadata (MD1) may be embedded in one or more of the 15 places available for the public keys in the redeem script.

Therefore, in one example, the first redeem script (RS1) may take the form of:

<NumSigs Metadata1 Metadata2 . . . PubK1 PubK2 . . . NumKeys OP_CHECKMULTISIG> where

NumSigs—is the number "m" of valid signatures required to satisfy the redeem script to unlock the transaction Metadata1 and Metadata2—includes metadata that takes the place of a public key PubK1 and PubK2—are actual public keys. In one example, PubK1 may be the first user public key (P1A) and PubK2 may be the issuer public key (P1I)

NumKeys—is the is total number of positions taken by the metadata and the public keys (which must be 15 or less)

The advantage of this is that the metadata will be included in the first redeem script (RS1), which in turn will be hashed and the record of which will be included in the blockchain 9. Therefore, it would be difficult, if not impossible, to change the values of the metadata without resulting in a change of the corresponding hash of the first redeem script hash (RS1).

A practical advantage may be illustrated by the following example. The first user (A) 5 and the issuer (I) 3 may wish to enter into a contract with particular terms and conditions. The contract may include the issuer (I) creating a token, whereby the specific terms and conditions are included in the metadata embedded in the redeem script. A hash of the redeem script is then recorded on the blockchain 9, which becomes a record of the transaction that is difficult or impossible to change. Say the issuer (I) attempts to deceive the first user (A) 5, and for example, attempts to modify a term and alleges that the modified term was in the originally agreed contract. The first user (A) 5 may be able to contest this by placing the modified term in the metadata of the redeem script and hashing it, and then showing that this does not match the redeem script recorded on the blockchain. Therefore, including information associated with the token in the at least first metadata may be useful for ensuring the integrity of the token.

It is to be appreciated that the metadata in the redeem script may itself include a hash of other information. For example, if the terms and conditions is lengthy, a hash of the terms and conditions may be used to provide a shorter metadata.

The first redeem script (RS1) may be stored in the data store 11 as a record and for redeeming the first token (T1). In some alternative examples, the first redeem script may be sent to the first user (A) 5, or a third party.

The Metadata

In the present example, the first redeem script (RS1) takes the form:

<2 Metadata1 Metadata2 P1A P1I 4 OP_CHECKMULTISIG>

Thus the at least first metadata (MD1) includes both Metadata1 and Metadata2 that occupies two of the places in the redeem script. This is followed by two public keys in sequence, the first user public key (P1A) and the first issuer public key (P1I). The NumSigs is 2, which means two signatures are required to unlock the transaction.

The metadata may include information regarding the token in a number of ways. As discussed, in one example the terms and conditions may be included in the metadata. In another example, a hash of the terms and conditions may be included in the metadata. In yet another example, the metadata may include a pointer to a file that contains the terms and conditions of a contract. In further embodiments, combinations including one or more of the above may be included in the metadata.

(i) Metadata with Pointer to Terms and Conditions

A specific example of the first metadata (MD1) is illustrated in Table 1 below.

TABLE 1

| Field | Sub-field | Bytes | Value | Comments |
|---|---|---|---|---|
| Metadata1 | Contract Type | 4 | | Coded value indicates type of contract. |
| | Contract Pointer | 16 | | IPv6 address of the actual contract file location |
| | Contract Type Data 1 | 12 | | Format depends on value of Contract Type. Padded with zeros |
| Metadata2 | Contract Hash | 20 | | RIPEMD-160 (SHA256 (actual contract file addressed by Contract Pointer)) |
| | Contract Type Data 2 | 12 | | Format depends on value of Contract Type. Padded with zeros |

This example includes a minimum amount of information in relation to the token and transaction. This example includes providing a pointer to the (smart) contract, which may be useful where the size of the contract precludes including such details in the metadata. Furthermore, since the metadata may be made public, or transmitted over an unsecure network, it may be desirable that specific details of the token be veiled or hidden for privacy reasons.

The first 4 bytes of metadata1 indicates the type of contract. For example, the contract type may be for 'Fiat Currency'. The next 16 bytes holds the IP address of the location of the actual electronic contract file, making allowance for IPv6 addresses. Note that in some embodiments, this value may point to the seed of a torrent file such that the contract file can be distributed over the cloud rather than being centralised. The following 12 bytes contains data specific to the type of contract.

The first 20 bytes of metadata2 is a hash of the actual contract file using RIPEMD-160 over SHA256 applied to the file. As the actual contract file is retrievable this allows validation of the transaction against the contract. Note that the contract file itself may be completely public (unencrypted and human readable) or may be encrypted for privacy, depending on the requirements of the specific embodiment. The content of the remaining 12 bytes of metadata2 may be used depending on the type of contract.

(ii) Metadata with Key Parameters of the Token

Another specific example of the first metadata (MD1) is illustrated in Table 2 below:

TABLE 2

| Field | Sub-field | Bytes | Value | Comments |
|---|---|---|---|---|
| Metadata1 | Contract Type | 4 | 0x00000001 | Indicates Fiat Currency |
| | Contract Pointer | 16 | | IPv6 address of the actual contract file location |
| | Fiat Denomination | 2 | | Coded value indicating currency (e.g. 0x0001 = CAD, 0x0002 = PHP, etc) |

TABLE 2-continued

| Field | Sub-field | Bytes | Value | Comments |
|---|---|---|---|---|
| | Pegging Rate | 1 | | Coded value represents the BTC/fiat pegging rate. |
| | Transaction Type | 1 | | Coded value represents type of output (issuance/payment/redemption) |
| | Padding | 8 | 0x00000... | Spare bytes |
| Metadata2 | Contract Hash | 20 | | RIPEMD-160 (SHA256 (the actual contract file addressed by Contract Pointer)) |
| | Padding | 12 | 0x00000... | Spare bytes |

In this example, some key parameters of the token included in the metadata. By key parameters, this may include information relevant the token itself or information that may assist processing of the transaction. In particular, the bytes allocated to the Sub-field "ContractTypeData1" in Table 1 above has been used for indicating: fiat denomination, pegging rate, and transaction type.

Inclusion of the key parameters in the metadata may assist greater processing efficiency as the issuer (I) 3 may, in some cases, process the tokens in transactions without retrieving the contract file for the key information required to process the transaction.

In addition to the above information, other information relating to the history of the token or the tokens preceding the token may be included. For example, if the first user (A) 5 wishes to redeem a portion of the first token (T1) and a second token (T2) is created by the issuer (I) to represent the value of the remaining portion, the issuer may embed information in the metadata to associate the second token (T2) with the first token (T1). This may assist the issuer (I) to account for and keep track of the tokens without the expense of tracing through the history of transactions, which, for an issuer (I) such as a bank, can be an intensive task.

In Table 2, the metadata contains a 2-byte field to indicate the fiat currency (FiatDenomination) and 1-byte field called PeggingRate. The pegging rate is set by the Issuer (I). Several different rates may be set for the same fiat currency; however, a different token (with a different contract) will be needed for each different rate. The choice of rate may be at the discretion of the Issuer (I), however who may take similar considerations for the pegging rate as for the allocation of the quantity of cryptocurrency for the token as discussed above.

In one example, the PeggingRate is an 8-bit coded value as follows:
Leftmost bit will be used as a flag:
1=rate expressed as satoshis/cent ('cent' refers to one hundredth of the fiat currency, which is the minimum fiat amount)
0=rate expressed as cents/satoshi
The rightmost seven bits represents the rate as a power of ten in binary, for example:
USD 10000010 means rate of 100 satoshis/cent (flag is on)
PHP 00000000 means rate of 1 centavo/satoshi (flag is off)
IDR 00000001 means rate of 10 rupiah/satoshi (flag is off)

In one example, TransactionType is a 1-byte field indicating whether the transaction is an "issuance" (in which a token is created from cryptocurrency), a payment (in which at least part of the token value is transferred from one user to another user); or a redemption (in which tokens are transferred to the issuer (I) and converted back to regular cryptocurrency).

In some examples, the "Padding" in both the Metadata1 and Metadata2 may include randomly generated values for each transaction. The result is that each of Metadata1 and Metadata2 will vary between transactions. An advantage is that this may lower the risk, and motivation, of an unscrupulous person trying to determine a private key that would match one or both of Metadata1 or Metadata2 as a cryptographic pair (for the purpose of using such a private key to sign the redeem script). This may be important for standardised tokens where the remaining bulk of the Metadata1 or Metadata2 is the same.

The Public Keys

The first user public key (P1A) and the issuer public key (P1I) are respectively paired with corresponding first user private key (V1A) and issuer private key (V1I). It will be appreciated that in some embodiments, the public keys may be known widely to the public, while in other embodiments, it may be desirable to communicate the public keys as required.

In some embodiments, the issuer (I) is a financial institution that also manages an electronic wallet of the first user (A) 5 and second user (B) 7 and the first user (A) 5 and second user (B) 7 may access their respective electronic wallets through a virtual machine environment or a terminal. The electronic wallet may be hosted by the issuer (I) 3 (or a server associated with the issuer (I) 3) and the private key(s) of a corresponding user are stored in the data store 11 but can only be accessed (or recreated) by the issuer (I) 3 with authorisation from that user. In such cases, the first and second users 5, 7 may authorise their private keys to be provided to the issuer (I) 3 to unlock the redeem script. This may include authorising the user's private key(s) to be sent to the first processing device 13 of the issuer (I) 3, wherein the first processing device 13 may unlock the redeem script with the user's private key(s) (e.g., P1A, P1B) and the first issuer public key (P1I).

Sending a First Data Output (O1) to a Blockchain 150

The method 300 further includes sending by the issuer (I) 3, over a communications network 8, a first data output (O1) to a p blockchain 9, at 314. This first data output (O1) may include an indication of a transaction transferring the first quantity of cryptocurrency (B1) to the first user (A) 5, that is, recording that the underlying quantity of cryptocurrency (B1) associated the first token (T1) has been transferred to the first user (A) 5. The first data output (O1) also includes the first hash (H1) discussed above. The first hash (H1) is associated with the first quantity of cryptocurrency (B1), to provide a record of the first token (T1) that is associated with the first user (A) 5 and the issuer (I). Thus, the first hash (H1) is recorded on the blockchain 9 and can be used to prove or verify the existence of the token (T1), the relationship between the issuer (I) and first user (A) 5, and/or the terms and conditions of the token.

The method 300 may also include storing 160 the first redeem script (RS1) in a data store 11 for later use.

A specific example of a transaction that creates a first token (T1) will now be described with reference to FIG. 2. First User (A) 5 Deposits $1000 AUD to the Issuer (I) for Equivalent Value in a Token In this example, the first user (A) 5 wishes to deposit $1000 AUD to the issuer (I), who, in return creates a first token (T1), with a token value (TV1) of $1000 AUD, by associating this with a first quantity of cryptocurrency (B1) of 10,000,000.

To create tokens, the issuer (I) needs to have cryptocurrency. This may be sourced from previous transactions or sourced in response to the request from the first user (A) 5 for a first token (T1). This is shown on the left-hand side of FIG. 2 as the "First quantity of (untokenised) cryptocurrency".

Table 3 below shows an originating transaction output, in the form of transaction-ID/Satoshis amount/locking script. This originating transaction output represents the cryptocurrency that the issuer (I) has acquired from a previous transaction and in which at least some of the cryptocurrency will be used for association with the first token.

TABLE 3

ID-201
50,000,000
OP_DUP OP_HASH160 <PubK-Issuer hash> OP_EQUALVERIFY OP_CHECKSIG The first line "ID-201" is a transaction identifier to identify this transaction. The next line is the number of satoshis in this transaction, which is 50,000,000. The third line is the locking script (output script) for this transaction. The redeem script in this output, <PubK-Issuer hash>, shows that this output has been locked with the first issuer public key (P1I). That is, this transaction can be unlocked using the issuer's corresponding first issuer private key (V1I).

As discussed above, the method 300 includes allocating a first quantity of cryptocurrency (B1) suitable for the first token (T1), at 310. However, the quantities of cryptocurrency that the issuer (I) has on hand may not exactly match the first quantity of cryptocurrency (B1). In the present example, the required first quantity of cryptocurrency (B1) is 10,000,000, which is much less than the 50,000,000 in from the transaction ID-201. Accordingly, a transaction to create a first token (T1) may include providing change of cryptocurrency back to the issuer (I) for the excess amounts of cryptocurrency that was not required for the token. Furthermore, the creation of the token 100 may be a transaction that requires a payment of a transaction fee to a miner. This is illustrated with reference to Table 4 below that shows the transaction for creating the tokens.

TABLE 4

| ID-210 | Transaction-ID |
| --- | --- |
| Version number | Version number |
| 1 | Number of inputs |
| ID-201 | Prev Trans Output |
| IDX-00 | Prev Trans Output index |
| Sig-Issuer PubK-Issuer | ScriptSig |
| 00000000000000000000000000 00000011 | Sequence number |
| 2 | Number of outputs |
| 10,000,000 | Output value |
| Output script length | Output script length |
| OP_HASH160<redeem script hash> OP_EQUAL | Output script |
| 39,999,000 | Output value |
| Output script length | Output script length |
| OP_DUP_OP_HASH160 <PubK-Issuer hash> OP_EQUALVERIFY OP_CHECKSIG | Output script |
| Lock Time | Lock Time |

The first line "ID-210" is a transaction identifier to identify this transaction. The second line indicates the "Version number" that states the version of the Bitcoin protocol used. The third line indicates the number of inputs for this transaction, which indicates a single input.

Lines 4 to 7 in Table 4 relate to those of the "input"—that is, a previous transaction, ID-201 that is funding the present transaction, ID-210. Line 4 is the transaction identifier of the previous transaction, ID-201. Line 5 "IDX-00" is an index of the output of the previous transaction, ID-201 (which in this case is a reference that the first output from the previous transaction, ID-201, should be used). Line 6 is the "ScriptSig", which is the unlocking script for the previous transaction, ID-201. As noted above, previous transaction was locked with the first issuer public key (P1I), that is represented by PubK-Issuer. Accordingly, the previous transaction can be unlocked using the issuer's corresponding first issuer private key (V1I) that is represented as Sig-Issuer. Line 7 is a sequence number associated with the input. In bitcoin transactions each contains a 4-byte field called 'sequence number', which is no longer used by the bitcoin core. Depending on the issuer's implementation, an option is to utilise this field to allocate transaction inputs to outputs. The sequence number can represent a string of 1-bit flags whereby the position of each flag starting with the rightmost bit indicates that the input has contributed part of its funds to the flagged output. In this example, the sequence number "00000000000000000000000000000011" indicates that the input is to be paid into outputs 1 and 2, which will be described below.

Line 8 in Table 4 indicates the number of outputs for this transaction, which is two. Lines 9 to 11 represent the first output and lines 12 to 14 represent the second output.

The first output reflects the first quantity of cryptocurrency (B1) that is associated with the first token (T1). Line 9 is an output value of first quantity of cryptocurrency (B1), which is satoshis. Line 10 indicates the output script length. Line 11 is the output script—i.e., the locking script that locks the first quantity of cryptocurrency (B1). This includes the first hash (H1) of a first redeem script (RS1) and is represented by:

OP_HASH160 <redeem script hash> OP_EQUAL

The "OP_HASH160" is a type of hash function where the input is hashed twice—with SHA-256 and subsequently with RIPEMD-160. The redeem script hash is the hash of the first redeem script (RS1), which is in the form described above, and for this example is:

2 metadata1 metadata2 P1A P1I 4 OP_CHECKMULTISIG

This includes the first user public key (P1A) and the first issuer public key (P1I) as described above. The metadata 1 and metadata2 may include metadata as described above, including an indication that this is an "issuance" transaction. OP_EQUAL provides a Boolean result for verifying the output.

The second output reflects the issuer's change for the transaction. Since the input, being the previous transaction ID-201, included 50,000,000 satoshis, the Issuer (I) can expect to receive left over satoshis. Line 12 is an output value for the second output, which is 39,999,000. Line 13 is the output script length and line 14 is the output script for the second output. Since the second output is the change back to the issuer (I), the issuer should be free to spend the second output. Accordingly, the output script (i.e., locking script) only includes the first issuer public key (P1I), which is represented by <PubK-Issuer hash>.

Generally, the output value(s) of a transaction must be equal to or less than the input. In the above example, the input was 50,000,000 and the output is 49,999,000 (based on 10,000,000 of the first output and 39,999,000 of the second output). Thus, there is a deficit of 1,000 satoshis. In this example, the 1,000 satoshis is a transaction fee (e.g., miner's fee).

Overview of Redeeming Part of or all of the Value of a Token by the First User (A) with the Issuer (I)

Generally, tokens are redeemed with the issuer (I) 3. In embodiments, where the issuer (I) is a service provider that provides electronic wallets for the users 5, 7, the private keys of the users are kept secure in a data store 11 associated with the issuer (I) 3. Therefore, in such embodiments, the users 5, 7 (or their respective processing devices 15, 17) do not sign the redeem script. Instead, the issuer (I) 3, with authorisation from the users 5, 7, signs the redeem script. For example, the first user (A) 5 may send a request to redeem a token to the issuer (I) 3 and either implicitly, or explicitly, this request to redeem a token also includes an authorisation by the first user (A) 5 for the issuer (I) 3 to use the first user private key (P1A) to redeem the token.

A method for redeeming a first token (T1) may include receiving by the issuer (I) 3, over the communications network 8, a request from the first user (A) 5 to redeem the first token (T1), determining a first redeem script (RS1) associated with the first token (T1) and obtaining the first user private key (V1A), for example, from the data store 11 or from another entity or node. The issuer may then sign the first redeem script (RS1) with the user private key (P1A) and the first issuer private key (P1I). This may be advantageous as the issuer (I) 3, who is the service provider for the first user (A) 5, can perform these steps securely at the first processing device 13 and without sending the first redeem script (RS1), signed or unsigned, over the communications network 8.

The method may also include sending, over the communications network 8, a second data output (O2) to the blockchain 9 comprising an indication of a transaction of the first quantity of cryptocurrency (B1) to the issuer (I). Thus, the method returns the first quantity of cryptocurrency (B1) associated with the first token (T1) back to the issuer (I). In one example, since the first redeem script (RS1) is signed with the private keys of both the first user (A) 5 and the issuer (I), the recipient of the first quantity of cryptocurrency (B1) in this transaction, being the issuer (I) 3, may then spend the first quantity of cryptocurrency for other transactions—whether as cryptocurrency alone or with other associated tokens.

Transfer of Part of or all of the Value of a Token by the First User (A) to the Second User (B)

In some embodiments, in order to allow the first user (A) 5 wishing to transfer the value, or portion thereof, of the first token (T1) to the second user (B), one or more additional tokens may be created. For example, a third token (T3) may be created that is associated with the second user (B) 7 and the issuer (I) 3. This may advantageously allow the first user (A) 5 to, in effect, transfer the same or similar rights associated with a first token (T1), to the second user (B). Although a new token, in the form of a third token (T3), is created, the third token (T3) may have similar characteristics as the first token (T1). For example, the tokens may have associated metadata that is the same or similar. This may be useful, for example, if the same or similar terms and conditions applicable between the first user (A) 5 and the issuer (I) 3 should also apply between the second user (B) 7 and the issuer (I) 3.

In one example, the first user (A) 5 may wish to transfer the entire value of the first token (T1) to the second user (B). Such cases may involve the creation of a third token (T3) associated with the first quantity of cryptocurrency B1 that is to be transferred to the second user (B) 7. Effectively, the third token (T3) is the transfer of the first token (T1), and rights associated with the first token (T1), to the second user (B) 7.

In a further example, only a first portion (R1) of the total value of the first token (T1) is transferred to the second user (B) 7, and in such cases, the remaining second portion (R2) of the total value may be included in a second token (T2) that is refunded back to the first user (A) 5. Thus, the request to create the third token (T3) may comprise, explicitly or implicitly, a request to create the third token (T3) with a third token value (TV3) based on the first portion (R1).

Transfer a Token by the First User (A) to the Second User (B) without the Involvement of the Issuer (I) or Other Third-Party Intermediary.

In the examples described in the section above, the transfer of the value of a token from the first user (A) 5 to the second user (B) involves the issuer (I) 3 as an intermediary to facilitate the transfer. This is distinguished from a direct transaction of the first quantity of cryptocurrency (B1) from the first user (A) 5 to the second user (B) 7.

However, in some cases, it may be desirable to transfer the value of a token by the first user (A) 5 to the second user (B) 7 without the involvement of the issuer (I) 3 or other third-party intermediary. For example, such a situation may arise if the second user (B) 7 does not have a service provider or if the service provider of the second user (B) 7 is not within the same web of trust as the service provider of the first user (A) 5 or the issuer (I) 3 responsible for minting the token. In such embodiments, the second user (B) 7 may wish to take precautions to ensure the legitimacy or validity of the token being transferred.

Generally, if the second user (B) 7 has a service provider (SPB) within the same web of trust as the service provider (SPA) of the first user (A) 5, then the service provider (SPB) acts as a signatory for the transaction on spending or redeeming the token and accordingly, the second user (B) 7 is assured of the token's authenticity or validity. However, if the second user (B) 7 does not have a service provider (SPB) or does not have a service provider (SPB) within the same web of trust as the service provider (SPA) of the first user (A) 5, the issuer (I) or an authorised party will not be available to authenticate or validate the transaction.

Thus, the second user (B) 7 may wish to determine the legitimacy of a token (T1) being transferred to the second user (B) 7. In some embodiments, a validation application comprising executable computer code is stored in memory 1520 (FIG. 8) of the processing device 17, and when executed by processor 1510 (FIG. 8) of the processing device 17, causes the processing device 17 to perform a method 600 or 700 of determining the validity of a token (T) associated with a quantity of cryptocurrency, as discussed in more detail below with reference to FIGS. 6 and 7 respectively. In some embodiments, the second user (B) 7 may manage an electronic wallet (not shown), which may be accessed through a virtual machine environment or a terminal associated with the processing device 17 and the electronic wallet may include an add-on feature that allows the second user (B) 7 to cause the processing device 17 to execute the validation application.

A specific example of a transaction that transfers a token (T1) from the first user (A) to the second user (B) will now be described with reference to FIG. 4.

First User (A) Transfers the First Token (T1) to the Second User (B)

Figure 4:
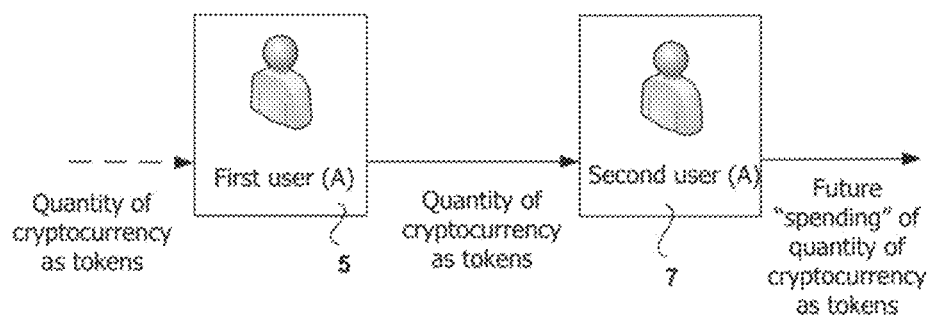
FIG. 4 is a diagram illustrating an example of a second type of transaction between a first user and a second user that includes transferring a token.

In this example, the first user (A) 5 wishes to transfer the token (T) to the second user (B) as shown in FIG. 4. This results in a transaction of the quantity of cryptocurrency from the first user (A) 5 to the second user (B) 7, referred to as transaction ID-510 below. The transfer of the quantity of cryptocurrency to the second user (B) 7 allows the second user (B) 7 to then spend the quantity of cryptocurrency (B1) as tokens for future transactions. The second user (B) 7 may also "detokenize" the quantity of cryptocurrency (B1) by one or more transactions that removes the metadata (which may include the payment transaction that transferred the quantity of cryptocurrency (B1) to the second user (B) 7).

The second user (B) 7 may further spend this cryptocurrency without the restriction of requiring authorisation (such as a signature) from the first user (A) 5 or other user.

Before describing the transaction to transfer the first token, ID-510, as illustrated in Table 7 below, we will briefly describe the originating transaction outputs (from transaction ID-500 and ID-400) that are the inputs to the present payment transaction, ID-510. The two inputs in general, include the quantity of cryptocurrency associated with the token (T), and another quantity of cryptocurrency that is used to pay the transaction fee (e.g., miner's fee).

For example, the first user (A) 5 may have received the quantity of cryptocurrency in transaction ID-500. The outputs that went to the first user (A) 5 in transaction ID-500 may be summarised as:

TABLE 5

| |
| --- |
| ID-500 |
| 10,000,000 |
| OP_HASH160,redeem script hash> OP_EQUAL |

Line 2 in Table 5 represents the quantity of cryptocurrency associated with the token (T) that numbers in 10,000,000 satoshis. Line 3 represents the output script, which is equivalent to line 11 in Table 4 described above.

The first user (A) 5 may also need to pay the transaction fee (e.g., miner's fee) for the payment transaction, ID-510, which is paid in part from a quantity of cryptocurrency received from a previous transaction, ID-400. This quantity of cryptocurrency may be summarised as:

TABLE 6

| |
| --- |
| ID-400 |
| 1,000 |
| OP_DUP OP_HASH160 <PubK-Alice hash>OP_EQUALVERIFY OP_CHECKSIG |

Line 2 of Table 6 indicates the amount of cryptocurrency from previous transaction, which is 1,000. Line 3 of Table 6 is the output script from this previous transaction. Since the cryptocurrency from this transaction, ID-400, is not associated with a token (or a user associated with a token), the redeem script hash is simply a hash of the first user public key (P1A), which is shown as PubK-Alice. That is, to spend the output from transaction ID-400, this simply requires the signing with the first user private key (V1A).

The transaction, ID-510, to transfer the first token (T1), will now be discussed with reference to Table 7 below.

TABLE 7

Line 1 "ID-510" is a transaction identifier to identify this transaction. The second line indicates the "Version number", which states the version of the Bitcoin protocol used. Line 3 indicates the number of inputs for this transaction, which indicates two inputs.
Lines 4 to 8 in Table 7 relate to those of the first input - that is, a previous transaction,
Transaction: Alice pays Bob 10,000,000 tokenised bitcoin

| | |
| --- | --- |
| ID-510 | Transaction ID |
| Version number | Version number |
| 2 | Number of inputs |
| ID-500 | Prev Trans Output |
| IDX-00 | Prev Trans Output Index |
| Script length | Script length |
| Sig-Alice Sig-Issuer <2 metadata1 metadata2 PubK-Alice PubK-Issuer 4 OP_CHECKMULTISIG> | ScriptSig |
| Sequence number | Sequence number |
| ID-400 | Prev Trans Output |

TABLE 7-continued

Line 1 "ID-510" is a transaction identifier to identify this transaction. The second line indicates the "Version number", which states the version of the Bitcoin protocol used. Line 3 indicates the number of inputs for this transaction, which indicates two inputs.
Lines 4 to 8 in Table 7 relate to those of the first input - that is, a previous transaction, Transaction: Alice pays Bob 10,000,000 tokenised bitcoin

| | |
|---|---|
| IDX-01 | Prev Trans Output Index |
| Script length | Script length |
| Sig-Alice PubK-Alice | ScriptSig |
| Sequence number | Sequence number |
| 1 | Number of outputs |
| 10,000,000 | Output value |
| Output script length | Output script length |
| OP_HASH160 <redeem script hash> OP_EQUAL | Output script |
| LockTime | LockTime |

ID-500 that is funding the present transaction, ID-510. Line 4 is the transaction identifier of the previous transaction, ID-500. Line 5 "IDX-00" is an index of the output of the previous transaction, ID-500 (which in this case is a reference that the first output from the previous transaction, ID-500, should be used). Line 6 is "Script length", which is an indication of the script length. Line 7 is "ScriptSig", which is the unlocking script for the previous transaction, ID-500. As indicated, previous transaction ID-500 was locked with the first user (A) public key (P1A) represented by PubK-Alice and a first issuer public key (P1I) represented by PubK-Issuer. Accordingly, the previous transaction can be unlocked using Alice's corresponding private key (V1A) that is represented as Sig-Alice and the issuer's corresponding first issuer private key (VI1) that is represented as Sig-Issuer. Line 8 is a sequence number associated with the input.

The first user (A) also needs to pay the transaction fee (e.g., miner's fee) for the transfer transaction, ID-510, which is paid in part from a quantity of cryptocurrency received from a previous transaction, ID-400. Lines 11 to 15 in Table 7 relate to those of the second input—that is the payment of the miner's fee. Line 11 is the transaction identifier of the previous transaction, ID-400. Line 12 is "IDX-01" is an index of the output of the previous transaction, ID-400. Line 13 is "Script length", which is an indication of the script length. Line 14 is "ScriptSig", which is the unlocking script for the previous transaction, ID-400. Since the cryptocurrency from this transaction, ID-400, is not associated with a token (or a user associated with a token), the redeem script hash is simply a hash of the first user public key (PIA), which is shown as PubK-Alice. That is, to spend the output from transaction ID-400, this simply requires the signing with the first user private key (V1A). Line 15 is a sequence number associated with the input.

Line 17 of Table 7 indicates the number of outputs for this transaction, which is one. Lines 18 to 21 represent the output, which reflects the quantity of cryptocurrency that is associated with the token (T). Line 18 is an output value of quantity of cryptocurrency, which in this case is 10,000,000 satoshis. This corresponds to the quantity of cryptocurrency from the token (T). Line 19 indicates the output script length. Line 20 is the output script—i.e., the locking script that locks the transfer of the token (T) associated with the quantity of cryptocurrency to the second user (B). This includes the hash (H) of a redeem script (RS) and is represented by:

OP_HASH160 <redeem script hash> OP_EQUAL

The "OP_HASH160" is a type of hash function where the input is hashed twice—with SHA-256 and subsequently with RIPEMD-160. OP_EQUAL provides a Boolean result for verifying the output. The redeem script hash is the hash of the redeem script (RS), which is in the form described above, and for this example is:

1 metadata1 metadata2 PubK-Bob 3 OP_CHECKMULTISIG

This redeem script includes the metadata from the token (T) as well as the issuer public key (P1I) shown as PubK-Issuer. The metadata 1 and metadata2 may include metadata as described above, including an indication that this is a "payment" transaction. This redeem script requires one of three signatures to spend the 10,000,000 satoshis. In practice, the second user private key (V1B) may be used to sign and spend the cryptocurrency for subsequent transactions. It notable that the first user public key (P1A) is not in this redeem script. This is because the token (T) and accordingly, the associated quantity of cryptocurrency, has been transferred to the second user (B) 7 and therefore may be considered as spent by the first user (A) 5. Accordingly, the second user (B) 7 should be free to spend the token (T) without requiring authorisation (such as implicit authorisation through a signature of the first user (A) 5).

In this example, the previous transaction, ID-500 (i.e., the unspent transaction output (UTXO)) that is funding the present transaction, ID-510 has been signed by the issuer I. Thus, in some embodiments, the second user (B) 7 may determine that the first token (T) associated with a quantity of cryptocurrency associated with the transaction ID-510 is valid if the token (T) has been authenticated, for example, signed, by an authorised signatory, such as the issuer (I). For example, the token (T) may be considered to have been authorised by an authorised signatory if a redeem script (RS) associated with the token (T) and referenced as an input to the transaction ID-510 has been signed by an authorised or trusted signatory.

However, consider the case that the service provider (SPA) of the first user (A) 5 is not in the same web of trust as the issuer (I) and that the token (T) associated with the transaction ID-510 is not signed by an authorised signatory. In such a circumstance, the redeem script of the previous transaction ID-500 shown on Line 7 of Table 7, for this example would instead take the form:

1 metadata1 metadata2 PubK-Alice 3 O_CHECKMULTISIG

In this embodiment, the redeem script (RS) associated with the token (T) and referenced as an input to the transaction ID-510 has not been signed by an authorised signatory and accordingly, the second user (B) 7 may not be assured as to the legitimacy of the token (T) by considering the redeem script (RS) referenced as the input funding the transaction ID-510 alone.

The Title Registry Store

As discussed in reference to FIG. 1, in some embodiments, the system 1 comprises the title registry store 23, which may be controlled or influenced by a control/management application running on the one or more processing devices 21. For example, the management application comprising executable code may be stored in memory 1520 (FIG. 8) of the one or more processing devices 21 and processor(s) 1510 (FIG. 8) of the one or more processing devices 21 may be configured to execute the management application to perform a method of managing the title registry store 23. The title registry store 23 may be configured to record information pertaining to transactions relating to transfers of tokens.

In some embodiments, the title registry store 23 maintains a record of a change of ownership of a token (T), i.e., the fact that the ownership has changed, without explicitly identifying the current owner of the token (T). Thus, in some embodiments, the title registry store 23 may comprise a list or sub-list of validated or verified unspent transaction outputs (UTXOs). For example, if a transaction has been recorded on the title registry store 23, the title store register 23 may include at least one of the transaction identifier and the output script of a transaction, which includes an indication of the current owner, i.e., the public key of the current owner, embedded within metadata of the redeem script hash. The previous owner may be determined from their public key identified in the unlocking script of the input section of the transaction.

However, in other embodiments, the title registry store 23 may also, or instead, comprise an identifier of the current and/or previous owner of the token. For example, the title registry store 23 may comprise a "Know Your Customer" (KYC) register of direct and/or indirect clients. In some embodiments, the maintenance of a KYC register may be a provision in the contract associated with the token, such as a condition of ownership. In such an embodiment, a condition of validity of the token may require that a payee, such as the second user (B) 7, register directly with the party (P) or Issuer (I). This may be achieved via an off-block mechanism such as through a dedicated web page, with suitable checks such as requiring a signature to prove they are the owner, etc. In some embodiments, the party (P) or issuer (I) 3 may store the condition in an internal database, such as data store 11 or on a DHT, such as the DHT configured to store the terms and conditions of the contract described above. In some cases, the issuer (I) 3 may require knowing the current owner in order to perform certain obligations, such as paying any income attached to the contract. For example, if the contract relates to part ownership of a racehorse, it may be necessary for the Issuer to be identify a party to whom a share of winnings should be paid.

The one or more processing devices 21 may configured to receive data from the first, second, and/or third processing devices 13, 15, and 17, and/or the one or more processing devices 19 across the communications network 8 and to store the data in the title registry store 23. Similarly, the one or more processing devices 21 may configured to retrieve data from the title registry store 23 and provide the retrieved data to the first, second, and/or third processing devices 13, 15, and 17, and/or the one or more processing devices 19 across the communications network 8, for example, in response to a request for data and/or automatically, such as at predetermined or regular intervals.

In some embodiments, the recording in the title registry store 23 of a transaction comprising a transfer of a token (T) issued by an issuer (I) 3 is instigated by the issuer (I) 3 of that token (T). For example, having creating a token (T) for a user, such as the first user (A) 5 or the second user (B) 7, and in addition to sending the first data output (O1) to a blockchain 9 as described above at 314 in connection with the method 300 of creating a token, the issuer (I) 3, using the one or more processors 13, sends a request to record the transfer of the token to the management application of the title registry store 23 over the communications network 8 to the one or more processors 21 associated with the title registry store 23. The issuer of a token may also be responsible for maintaining or updating the title registry store 23 regarding transactions associated with the token, as discussed in more detail below.

In some embodiments, the title registry store 23 may comprise a distributed hash table (DHT). In some embodiments, the distributed hash table (DHT) may also be configured to store contracts associated with the tokens. In some embodiments, the distributed hash table (DHT) configured to store contracts associated with the tokens may include a field comprising one or more links or pointers pointing to a location of a relevant entry in the distributed hash table (DHT) of the title registry database 23.

Maintaining the Title Registry

In general, one or more parties (P) are responsible for updating the title store register 23 to maintain or keep an accurate record of any transfers of tokens, and accordingly, changes of ownership of the tokens. In some embodiments, each issuer (I) 3 of a token (T) is responsible for maintaining an accurate record of any changes of ownership of that token on the title store register 23, that is, a record of any transactions comprising a transfer of the token that have occurred.

Figure 5:
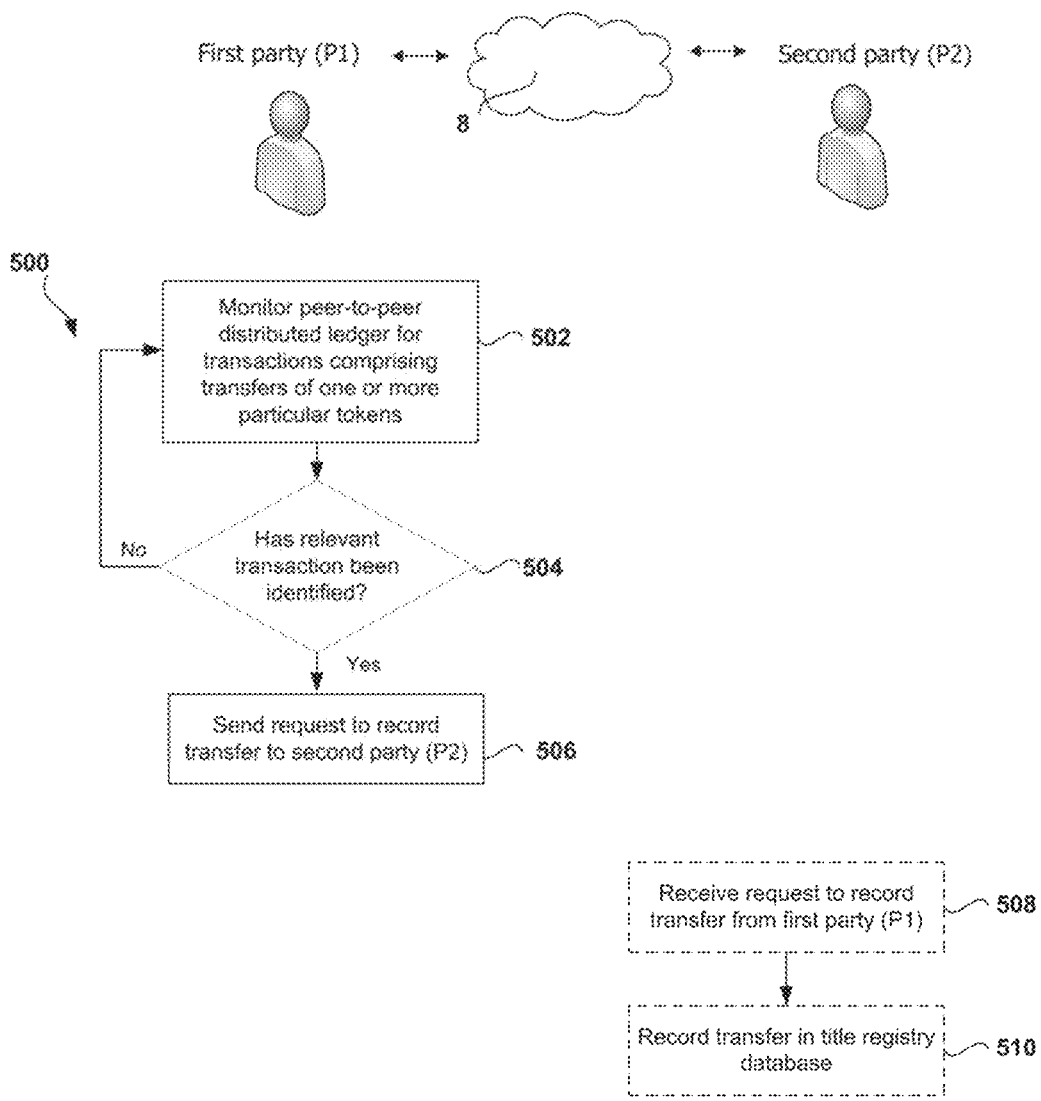
FIG. 5 is a process flow diagram of a computer-implemented method for maintaining a title registry database for recording transfers of tokens, according to some embodiments.

A method 500 of maintaining a title registry store 23 for recording transfers of tokens issued by an issuer (I), wherein each token is associated with a quantity of cryptocurrency, will now be described with reference to FIG. 5. In some embodiments, a title registry maintenance application comprising executable code may be stored in memory 1520 (FIG. 8) of the one or more processing devices 13 and processor(s) 1510 (FIG. 8) of the one or more processing devices 13 may be configured to execute the title registry management application to perform the method 500 of maintaining a title registry store for recording transfers of tokens. In other embodiments, the method 500 may be performed by a processing device (not shown) associated with an authorised party (P) connected to the communications network 8.

In performing the method 500, the maintenance application is configured to monitor a blockchain 9 for transactions comprising transfers of tokens issued by the issuer (I), at 502.

The blockchain 9, for example, the Bitcoin Blockchain, records transactions and may include details of the transactions (TXs) such as the previous transaction identifier, input script(s), and the output script(s). As described above, a token associated with a transaction may be determined from metadata of an input script of the transaction.

In response to determining a transaction comprising a transfer of a token (T) issued by the issuer (I), the maintenance application is configured to record the transfer of the token (T) on the title registry store 23. For example, in some embodiments, as shown in FIG. 5, the maintenance application is configured to send a request to record the transfer of the token (T) in the title registry store 23 to the management application hosted by the one or more processing devices 21 associated with a second party (P2) responsible for managing the title registry store 23.

In some embodiments, the request may comprise data including an indicator of a transaction comprising a transfer of the token (T). For example, the data may comprise a transaction identifier of the transaction and/or the first data output (O1). In some embodiments, the data is authenticated by the issuer (I) 3, for example, in that it is signed using the issuer's signature (VI1). The data may be retrieved from the details of the transaction of the token recorded in the blockchain 9.

In some embodiments, in response to receiving, by a second party (P2) from a first party (P1), such as the issuer (I) 3 of the token, a request to record a transfer of a token, at 508, the management application stored in memory (not shown) of one or more processing devices (not shown) associated with the second party (P2) is executed by a processor(s) (not shown) of the one or more processing devices (not shown) to enter the data in the title registry store 23, at 510. In some embodiments, a new entry is created in the title registry store 23 for each request or valid request received by the second party (P2). In some embodiments, if an entry for the token (T) associated with the request already exists, the management application may be configured to update the entry as opposed to creating another entry for the token (T).

Figure 6:
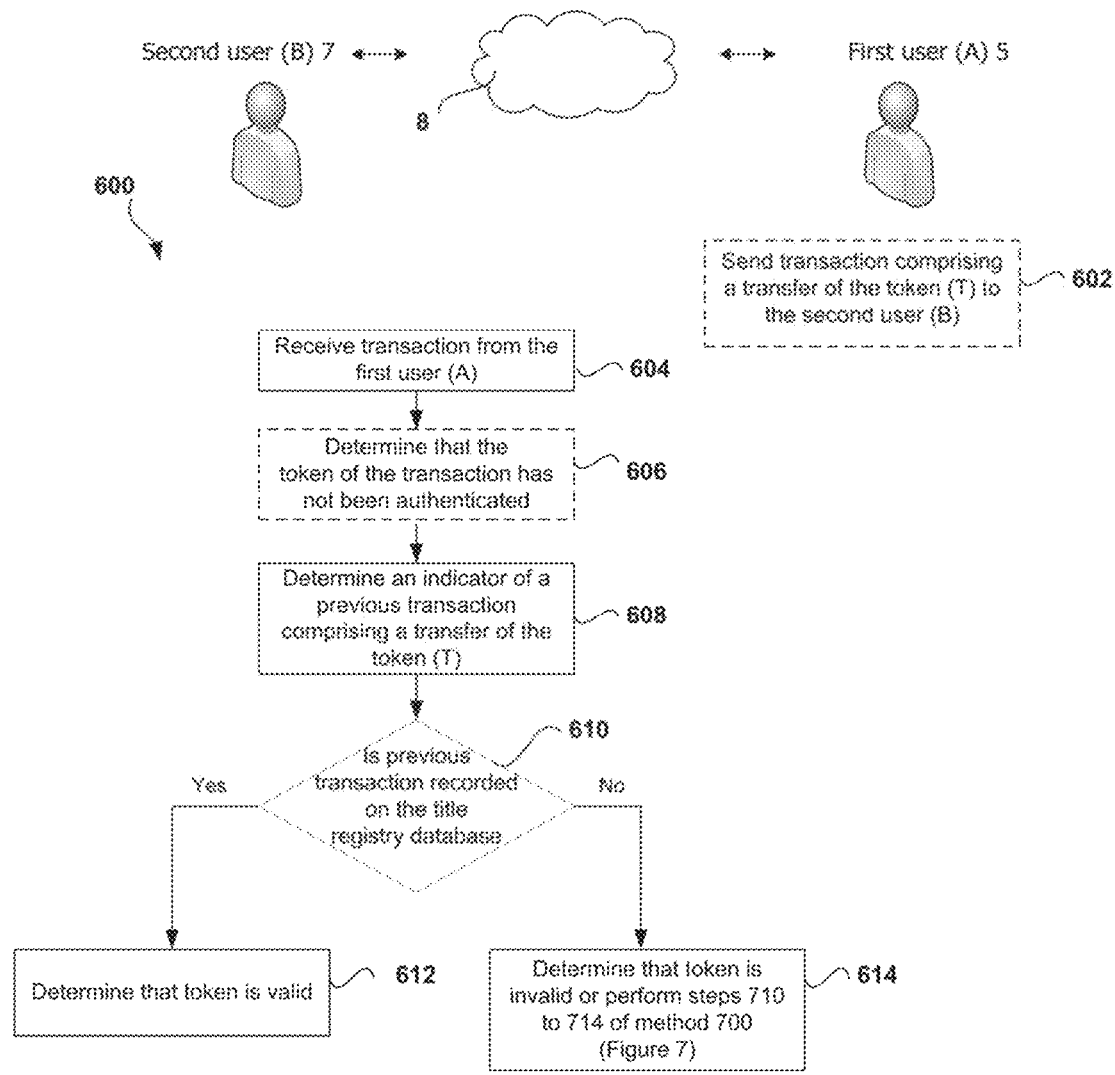
FIG. 6 is a process flow diagram of a computer-implemented method for validating a token, according to some embodiments.

Using the Title Registry to Validate the Token (T) Associated with the Transaction A method 600 of determining the validity of a token (T) associated with a quantity of cryptocurrency using the title registry store 23 will now be described with reference to FIG. 6. In some embodiments, the validation application comprising executable code may be stored in memory 1520 (FIG. 8) of the processing devices 17 and processor(s) 1510 (FIG. 8) of the processing devices 17 is configured to execute the validation application to perform the method 600 of determining the validity of a first token (T1) associated with a first quantity of cryptocurrency (B1). The method 600 may be performed by the processing device 17 associated with the second user (B) 7.

The first user (A) may send a first transaction comprising a transfer of the first token (T1) to the second user (B), at 602. In performing the method 600, the validation application is configured to receive, over the communications network 8, the first transaction comprising a transfer of the token (T) from the first user (A) to the second user (B), at 604. The first transaction may comprise a blockchain transaction for transfer of a portion of cryptocurrency, such as that discussed in connection with Table 7 above. For example, the transaction may comprise a transaction id, one or more inputs and one or more outputs. The input(s) may relate to previous transaction(s), and each may comprise a previous transaction id and an unlocking script comprising a redeem script associated with the first token (T1). At least one of the output(s) may relate to the transfer or payment being effected by the present or first transaction and may comprise a locking script.

In some embodiments, the validation application is configured to determine whether the token (T) has been authenticated, at 606. For example, this may involve determining whether the redeem script associated with the token (T) and referenced as an input to the first transaction has been signed by an authorised signatory, such as issuer of the token (T) or a trusted service provider.

The validation application determines an indicator of a second transaction or previous transaction comprising a transfer of the token (T), at 608. The second transaction may be a previous transaction that predates the first transaction. In some embodiments, the indicator may be a transaction identifier of the previous transaction. For example, the previous transaction may be a transaction identified as an input to the present transaction and the identifier may be identified as one of a plurality of input parameters of the present transaction.

The validation application is configured to query the title registry database 23 using the indicator to determine whether the second transaction is recorded on the title registry store 23, at 610. For example, if the second transaction has been recorded on the title registry store 23, the title store register 23 may include an indicator of the second transaction, such as the transaction identifier. Thus, in some embodiments, verification of the validity of a token may be determined despite not knowing who the previous or final owner is. Thus, embodiments of the invention provides a novel and advantageous validation technique, which solves a technical problem not addressed by the prior art.

However, in other embodiments, the title registry store 23 may also or instead comprise an identifier of the current and/or previous owner of the token. In some embodiments, the validation application may be configured to query the title registry store 23 only if the validation application first determines that the token (T) has not been authenticated as at 606.

In response to determining that the second transaction is recorded or registered in the title registry store, the validation application is configured to determine that the token (T) is valid, at 612.

In some embodiments, in response to determining that the second transaction is not registered in the title registry store, the validation application is configured to determine that the token (T) is not valid, at 612. However, in other embodiments, in response to determining that the second transaction is not registered in the title registry store, the validation application is configured to perform steps 710 to 714 of method 700 as described below, at 614.

Using the Blockchain to Validate the Token (T) Associated with the Transaction

Figure 7:
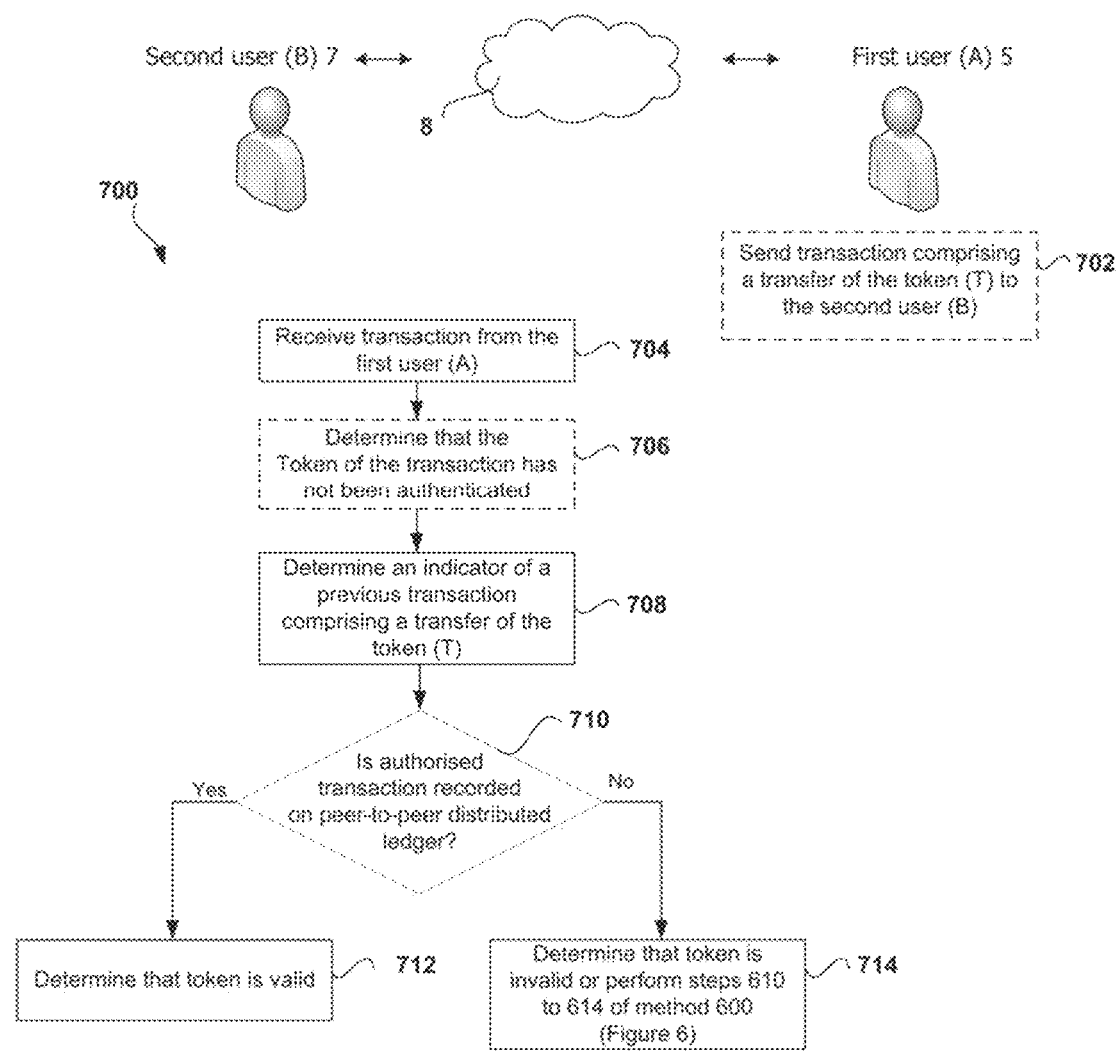
FIG. 7 is a process flow diagram of a computer-implemented method for validating a token, according to some embodiments.

A method 700 of determining the validity of a token (T) associated with a quantity of cryptocurrency using the blockchain 9 will now be described with reference to FIG. 7. In some embodiments, the validation application comprising executable code may be stored in memory 1520 (FIG. 8) of the processing devices 17 and processor(s) 1510 (FIG. 8) of the processing devices 17 is configured to execute the validation application to perform the method 700 of determining the validity of a token (T) associated with a quantity of cryptocurrency. The method 700 may be performed by the processing device 17 associated with the second user (B) 7.

The first user (A) may send a first transaction comprising a transfer of the token (T) to the second user (B), at 702. In performing the method 700, the validation application is configured to perform steps 704 and 708, which correspond with steps 604 and 608 of method 600 as described above in connection with FIG. 6. In some embodiments, the validation application is configured to perform step 706, which corresponds with step 606 of method 600 as described above in connection with FIG. 6.

The validation application is configured to use the indicator of the previous transaction to query the blockchain 9 to determine whether an authenticated transaction associated with the token (T) can be identified, at 710. An authenticated transaction comprises a transaction associated with the token (T) where the token (T) has been authorised. For example, a token may be considered to be authorised or legitimate if the redeem script associated with the token (T) has been signed by an authorised signatory, such as issuer of the token (T) or a trusted service provider. Signing may comprise a digital, cryptographic signature.

In some embodiments, the validation application may be configured to query the blockchain 9 only if the validation application first determines that the token (T) of the first transaction has not been authenticated as at 706. For example, this may involve determining whether the redeem script associated with the token (T) and referenced as an input to the transaction has been signed by an authorised signatory, such as issuer of the token (T) or a trusted service provider.

In some embodiments, querying the blockchain 9 comprises comparing the indicator of the previous transaction with corresponding indicators of transactions recorded in the blockchain 9 to identify a prior transaction having the same indicator as the indicator of the previous transaction. For example, the indicator of the previous transaction may comprise a previous transaction ID indicated in the first transaction.

The validation application is configured to step through (i.e., iterate over) entries in the blockchain 9 to locate an authorised transaction associated with the token. Thus, for example, if the most recent transaction identified in the blockchain 9 as being associated with the token (T) is not an authorised transaction, the validation application is configured to locate or identify the transaction associated with the token that immediately preceded the most recent transaction and to determine whether that transaction is an authorised transaction. If the transaction associated with the token that immediately preceded the most recent transaction is not an authorised transaction, the validation application is configured to locate or identify a yet earlier transaction associated with the token and to determine whether that transaction is an authorised transaction.

In some embodiments, the validation application is configured to determine that the most recent or earlier transaction is an authorised transaction comprises determining whether a redeem script associated with the token and referenced as an input to the transaction has been signed by an authorised signatory, such as issuer of the token (T) or a trusted service provider.

In some embodiments, in response to determining that a transaction recorded in the blockchain 9 is not an authorised transaction, the validation application is configured to determine an indicator of an earlier transaction from the entry of the transaction and to use the indicator of the earlier transaction to identify an entry for the earlier transaction in the blockchain 9. The indicator may comprise a previous transaction ID associated with the transaction. For example, in some embodiments, the validation application is configured to locate or identify the transaction that immediately preceded the most recent transaction or yet earlier transaction by determining a previous transaction identifier from an input script of the most recent transaction or earlier transaction. This process is performed iteratively until no earlier transaction can be identified.

Therefore, the invention provides an advantageous validation technique comprising the dynamic construction of a logical hierarchy of related blockchain transactions. The hierarchy is constructed starting from an initial transaction and using a plurality of sources because the transactions are recorded within different blocks on the blockchain. In this sense, the invention identifies and associates the relevant data from multiple sources and uses it in the validation process.

Once the validation application identifies an authorised transaction, the method 700 moves to step 712. If, however, the validation application does not identify an authorised transaction, the method 700 moves to step 714.

In response to identifying an authenticated transaction in the blockchain 9, the validation application is configured to determine that the token (T) is valid, at 712. For example, if the validation application determines that the redeem script of the prior transaction has been signed by an authorised signatory, the validation application identifies the prior transaction as an authorised transaction.

In some embodiments, in response to failing to determine an authenticated transaction in the blockchain 9, the validation application is configured to determine that the token (T) is not valid, at 714.

Processing Device

As discussed above in connection with FIG. 1, the issuer (I) 3, first user (A) 5 and second user (B) 7 may be associated with a first processing device 13, second processing device and a third processing device 17. The blockchain 9 may also be associated with one or more processing devices 19. The title registry database 23 may also be associated with one or more processing devices 21. Such a processing device may be part of an electronic device, such as a computer, tablet computer, mobile communication device, computer server etc. In addition to a processing device, the electronic device may include a data store 11 and a user interface (not shown).

Figure 8:
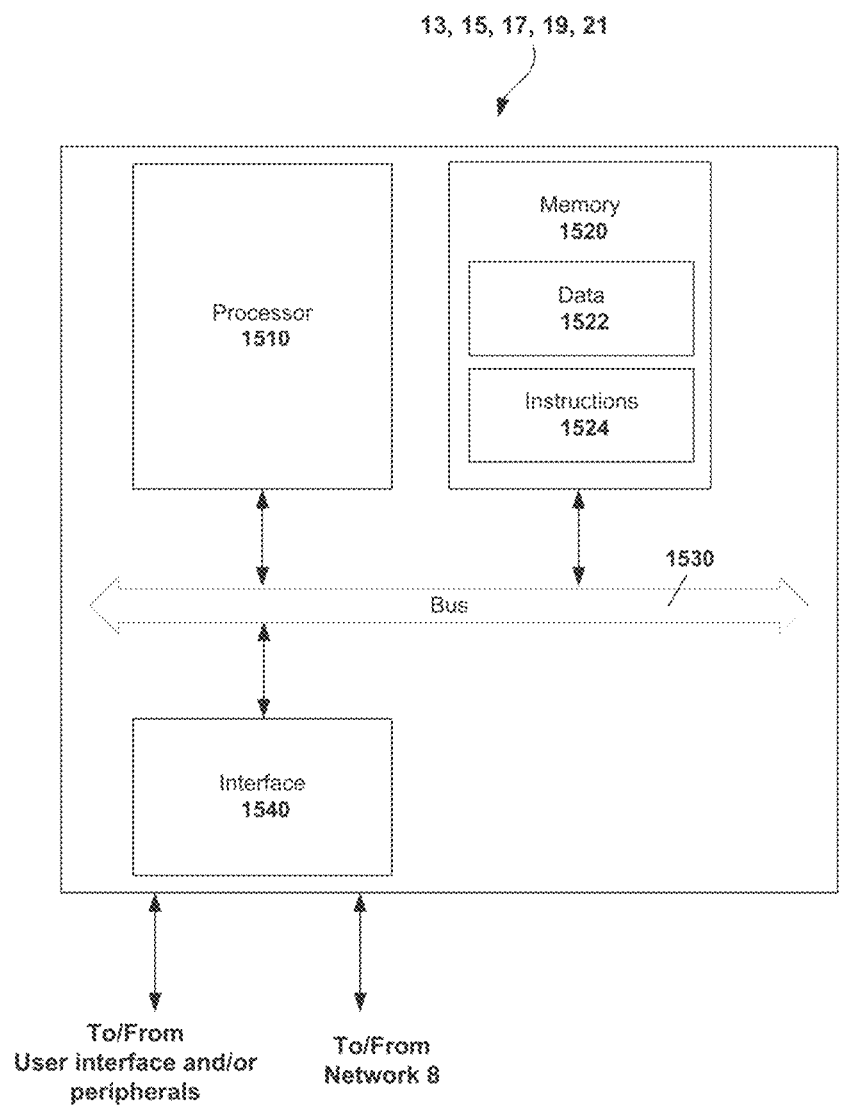
FIG. 8 illustrates a schematic example of a processing device of the system of FIG. 1, according to some embodiments.

FIG. 8 illustrates an example of a processing device 13, 15, 17, 19, 21. The processing device 13, 15, 17, 19, 21 includes a processor 1510, a memory 1520 and an interface device 1540 that communicate with each other via a bus 1530. The memory 1520 stores instructions and data for implementing the methods described herein, including methods 300, 500, 600 and 700, and the processor 1510 is configured to execute the instructions from the memory 1520 to perform the methods. The interface device 1540 may include a communications module (not shown) that facilitates communication with the communications network 5 and, in some examples, with the user interface and peripherals such as data store 11. It should be noted that although the processing device 1501 may comprise independent network elements, the processing device 13, 15, 17, 19, 21 may also be part of another network element. Further, some functions performed by the processing device 13, 15, 17, 19, 21 may be distributed between multiple network elements. For example, the issuer 3 may have multiple processing devices 23 to perform method 300, 500, 600 and/or 700 in a secure local area network associated with the issuer (I) 3.

Where this disclosure describes that a user, issuer, merchant, provider or other entity performs a particular action (including signing, issuing, determining, calculating, sending, receiving, creating etc.), this wording is used for the sake of clarity of presentation. It should be understood that these actions are performed by the computing devices operated by these entities.

Signing may comprise executing a cryptographic function. The cryptographic function has an input for a clear text and an input for a key, such as a private key. A processor may execute the function to calculate a number or string that can be used as a signature. The signature is then provided together with the clear text to provide a signed text. The signature changes completely if the message text or the key changes by a single bit. While calculating the signature requires little computational power, recreating a message that has a given signature is practically impossible. This way, the clear text can only be changed and accompanied by a valid signature if the private key is available. Further, other entities can easily verify the signature using the publicly available public key.

In most circumstances, encrypting and decrypting comprises a processor executing a cryptographic function to calculate an output string representing the encrypted message or a clear text message respectively.

Keys, tokens, metadata, transactions, offers, contracts, signatures, scripts, metadata, invitations, and the like refer to data represented as numbers, text or strings stored on data memory, such as variables in program code of type "string" or "int" or other types or text files.

An example of the peer-to-peer ledger is the bitcoin block chain. Transferring funds or paying fees in bitcoin currency comprises creating a transaction on the bitcoin block chain with the funds or fees being output from the transaction. An example of a bitcoin transaction includes an input transaction hash, a transaction amount, one or more destinations, a public key of a payee or payees and a signature created by using the input transaction as the input message and a private key of a payer to calculate the signature. The transaction can be verified by checking that the input transaction hash exists in a copy of the bitcoin block chain and that the signature is correct using the public key. To ensure that the same input transaction hash has not been used elsewhere already, the transaction is broadcast to a network of computing nodes ('miners'). A miner accepts and records the transaction on the block chain only if the input transaction hash is not yet connected and the signatures are valid. A miner rejects the transaction if the input transaction hash is already linked to a different transaction.

Allocating cryptocurrency for a token comprises creating a transaction with the allocated cryptocurrency and the token represented in a metadata field in the transaction.

When two items are associated, this means that there is a logical connection between these items. In a database, for example, identifiers for the two items may be stored in the same records to make the two items associated with each other. In a transaction, identifiers for the two items may be included in the transaction string to make the two items associated with each other.

Using the bitcoin protocol, redeeming a script and/or unlocking a token comprises calculating a signature string of the script and/or transaction using the private key. The script may require more than one signature derived from different private keys or other conditions. The output of this transaction is then provided to a miner.

Authorising another entity may comprise calculating a signature string of a transaction using a private key and providing the signature string to the entity to allow the entity to use the signature to verify the transaction.

A user having an account with another entity may comprise the entity storing information about the user, such as email address, name and potentially public keys. For example, the entity may maintain a database, such as SQL, OrientDB, MongoDB or others. In some examples, the entity may also store one or more of the user's private keys.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

What is claimed is:

1. A computer-implemented method of maintaining, by a first party, a title registry database for recording transfers of tokens issued by an issuer, wherein each token is associated with a quantity of cryptocurrency and is represented in a metadata field of a transaction on a peer-to-peer distributed ledger, the peer-to-peer distributed ledger being managed by one or more first processing devices and the title registry database being managed by one or more second processing devices and communicating with the one or more first processing devices over a communication network, the title registry database being implemented as an indexed storage, the title registry database including a set of validated transaction IDs and associated redeem scripts corresponding to previously validated token transfers, and a transfer of a token represents a change in ownership of the token, the method comprising:

monitoring the peer-to-peer distributed ledger for transactions comprising transfers of tokens issued by the issuer, by:
communicating with the one or more first processing devices to access the transactions on the peer-to-peer distributed ledger;
detecting a latest transaction of the transactions indicative of a given transfer of the token in response to the communicating, by:
monitoring the one or more first processing devices for new blocks containing token transfer transactions; and
identifying transaction metadata fields in the new blocks that match known token identifiers issued by the issuer, wherein the latest transaction includes a redeem script and a previous transaction ID referencing another transaction of the given transfer of the token recorded before the latest transaction;
determining the previous transaction ID based on the latest transaction in response to the detecting;
comparing the determined previous transaction ID and the included redeem script with the set of validated transaction IDs and associated redeem scripts of the title registry database to validate the given transfer of the token without traversing the peer-to-peer distributed ledger; and
determining that the latest transaction is a valid record of the given transfer of the token issued by the issuer in response to determining that the previous transaction ID matches a transaction ID of the set of validated transaction IDs; and
requesting that the one or more second processing devices update the title registry database to record the given transfer of the token in response to determining that the latest transaction is the valid record of the given transfer of the token issued by the issuer, such that the title registry database stores a transaction ID of the latest transaction and the included redeem script in the indexed storage for validating subsequent token transfers in an entry in the title registry database that is signed with a signature of the issuer.

2. The method of claim 1, wherein monitoring the peer-to-peer distributed ledger further comprises:
determining a target transaction ID of a transaction associated with a token issued by the issuer;
comparing the target transaction ID with previous transaction IDs of transactions recorded in the peer-to-peer distributed ledger; and
responsive to the target transaction ID matching a previous transaction ID of one of the transactions recorded in the peer-to-peer distributed ledger, determining the transaction recorded in the peer-to-peer distributed ledger as a record of a previous transaction.

3. The method of claim 1, further comprising authenticating the entry associated with the recording of the given transfer of the token in the title registry database by the signature of the issuer to the entry.

4. The method of claim 1, wherein maintaining the title registry database is performed by at least one of the issuer and an approved service provider.

5. The method of claim 1, wherein the title registry database comprises a distributed hash table.

6. The method of claim 5, wherein the distributed hash table comprises contracts associated with the tokens issued by the issuer.

7. A title registry maintenance system for maintaining the title registry database for recording transfers of tokens, each associated with a quantity of cryptocurrency, the title registry maintenance system comprising memory for storing a maintenance application and a processor, wherein the processor is configured to execute the maintenance application to perform the method of claim 1.

8. A non-transitory computer-readable medium storing instructions that, when executed by a processor, causes the processor to perform the method of claim 1.

* * * * *